USO05557359A

United States Patent [19]

Hasuda et al.

[11] Patent Number: 5,557,359
[45] Date of Patent: Sep. 17, 1996

[54] CAMERA INCLUDING SHUTTER CONTROL AND METHOD

[75] Inventors: Masanori Hasuda, Kanagawa-ken; Akira Katayama, Tokyo; Yukio Uemura, Tokyo; Tetsuro Goto, Chiba, all of Japan

[73] Assignee: Nikon Corporation, Tokyo, Japan

[21] Appl. No.: 258,727

[22] Filed: Jun. 13, 1994

[30] Foreign Application Priority Data

Jun. 17, 1993 [JP] Japan ................................. 5-171113
Jun. 21, 1993 [JP] Japan ................................. 5-173795

[51] Int. Cl.⁶ ............................. G03B 7/00; G03B 7/26; G03B 9/06
[52] U.S. Cl. ................... 354/234.1; 354/484; 354/21; 354/480
[58] Field of Search .................. 354/21, 484, 234.1, 354/480

[56] References Cited

U.S. PATENT DOCUMENTS

| | | |
|---|---|---|
| 4,557,573 | 12/1985 | Johnson et al. ............. 354/234.1 |
| 4,855,781 | 8/1989 | Hoshino ....................... 354/468 |
| 4,907,027 | 3/1990 | Kobe et al. . | |
| 5,019,846 | 5/1991 | Goto et al. . | |
| 5,134,435 | 7/1992 | Tsuboi et al. ............... 354/435 |
| 5,225,865 | 7/1993 | Shiomi et al. . | |
| 5,257,056 | 10/1993 | Kazumi ....................... 354/234.1 |
| 5,264,896 | 11/1993 | Lee et al. .................... 354/435 |
| 5,325,142 | 6/1994 | Depatie et al. ............. 354/234.1 |
| 5,351,101 | 9/1994 | Janson, Jr. ................. 354/21 |
| 5,389,983 | 2/1995 | Tsanefuji ..................... 354/21 |
| 5,416,543 | 5/1995 | Stephenson ................. 354/21 |

Primary Examiner—David M. Gray
Assistant Examiner—Daniel Chapik
Attorney, Agent, or Firm—Oliff & Berridge

[57] ABSTRACT

A camera including a shutter that regulates the exposure time of the recording medium, a shutter measuring device that measures the time during which the shutter exposes the recording medium, a discerning device that discerns whether or not the recording medium is an infrared sensitive medium, and a suppressing device that suppresses the action of the shutter measuring device when the discerning device discerns that the medium is the infrared sensitive medium. This structure prevents the accidental sensitization of infrared film in the camera. In an alternative arrangement, a controller controls the operation of the shutter measuring device in accordance with either the type of recording medium or a voltage amount supplied to the shutter measuring device.

47 Claims, 19 Drawing Sheets

CAMERA INCLUDING SHUTTER CONTROL AND METHOD

BACKGROUND OF THE INVENTION

1. Field of the Invention

The present invention relates to a camera that has a shutter movement state detecting device.

2. Description of the Related Art

With conventional cameras, light rays from a subject being photographed are controlled by the lens diaphragm, the length of exposure of the film being controlled by a mechanical shutter. The shutter used in single lens reflex cameras is basically composed of two curtains, i.e. a front curtain and a rear curtain, with the front curtain covering the film surface prior to exposure. When the shutter button is depressed, the front curtain first withdraws from the film surface, thereby starting the exposure of the film surface of light. After a set time has elapsed, the rear curtain moves to cover the film surface. The movement of the curtains is driven by the mechanical force of springs, and the start of movement is accomplished by releasing the stop of each curtain.

Heretofore, these actions were regulated through purely mechanical means, but in recent years electrical means have come to be widely used. The actual movement of the front and rear curtains is still accomplished in the same manner through the force of a spring, but the commencement of movement is regulated through a current to electromagnets that connect and hold the curtains.

With high speed shutter settings such as 1/8,000 of a second, a high strobe synchronization speed is necessary in order to make photography possible under bright conditions. In order to do so, it becomes necessary to rapidly boost the curtain movement speed by increasing the driving force of the described spring, and it also becomes necessary to narrow the width of the slit formed by the front curtain and the rear curtain.

However, even if the timing of electricity supplied to the electromagnet and the control of the exposure duration is accurate, the actual exposure duration is, as explained heretofore, dependent on the mechanical movement state of the curtains. This phenomenon is only further heightened by increasing the movement speed. The spring force had to be raised and the moving speed of each curtain (referred to hereafter as "curtain speed") had to be accelerated. Moreover, the width of the slits forming the front and rear curtains had to be narrowed.

Therefore, at high speeds above 1/8000 of a second, even if the electric current timing of the electromagnet is accurately regulated, there is a possibility that the desired shutter speed will not be obtained because of the separation speed of the mechanism that connects the electromagnet, and because there is some dispersion in the mechanical moving system that contains the spring. Furthermore, because this type of development is first discovered when the film is developed, a camera is offered that is constructed so as to have a shutter blade movement state detector built onto the shutter, and to be able to check the shutter time, a shutter timing device that can check the shutter speed even while photographing.

However, because the shutter blade movement state detector uses infrared rays (with a wavelength in the neighborhood of 920 nm), and because the detector is arranged in close proximity to the shutter aperture, there has been the problem of the infrared completely sensitizing the film that is in the position to be exposed.

In order to overcome such problems, Japanese unexamined patent application Hei 5-2231 reveals a method in which a detector is displaced inside the shutter that measures the actual shutter time and that issues a warning depending on the results of this measurement. In this instance, a photoelectric converter comprised of a light-emitting diode (LED) and a photoresistor (PTR), which is an example of a non-contact method, is used as the detector.

On the other hand, voltage check circuitry for the camera battery displaced within the camera is well known under the conventional art. When the battery voltage drops below a specified value, operation of the camera is prevented in order to prevent malfunctions, the primary purpose of the check circuitry being to provide a warning display that indicates the occurrence of the problem.

However, when the photoelectric converter described above is used as the shutter movement state detection system, its operation discharges the battery (power source).

In order to detect the short time interval corresponding to the faster shutter speeds, and in order to also narrow the slit formed by the front curtain and the rear curtain, it is necessary to increase the amount of light generated by the LED and to boost the operating speed of the PTR circuit, making increased power consumption by the detection circuit inevitable.

Accordingly, the operation of the shutter movement state detection system prevents the exposure operation comprising the main function of the camera, with the problem that the power source voltage drops during the exposure action, causing malfunctions to occur in the shutter movement state detection system.

SUMMARY OF THE INVENTION

It is an object of the present invention, in view of the aforementioned problem, to prevent the accidental complete sensitization of the infrared film in a camera that is equipped with a shutter blade movement state detector.

Another object of the present invention is to overcome such problems by providing a camera equipped with a shutter measurement device in which malfunctions in the camera caused by the discharged power source are prevented, facilitating more reliable photography.

In order to accomplish these and other objects, the camera according to one embodiment of this invention is constructed with a shutter that regulates the exposure time of the recording medium, a shutter measuring device that measures the time during which the shutter exposes the recording medium, and a controller coupled to the shutter measuring device for controlling operation of the shutter measuring device in accordance with at least one of a type of the recording medium and a voltage amount supplied to the shutter measuring device. The controller may include a type detector that detects a type of the recording medium and a preventing device that prevents operation of the shutter measuring device in accordance with the detection by the type detector.

A camera according to a second embodiment of this invention is constructed with a shutter that regulates the exposure time of the recording medium, a shutter measuring device that is equipped with a light radiator that radiates light, as well as a light receiving device that receives the light from the light radiator, and that measures the time during which the shutter exposes the recording medium, a type detector that detects the type of the recording device, and a regulator that regulates the amount of radiation from the light radiator and/or the light receiving sensitivity of the light receiving device, based on the result detected by the type detector. The regulator may be a wavelength limit regulator that regulates the radiation wavelength limits of the light radiator, based on the result detected by the type detector.

With such cameras, the infrared film is not sensitized because, through the installment of a suppressing device that prevents the action of the shutter measuring device when the discerning device discerns an infrared sensitive recording medium, the shutter blade movement state detector does not operate when an infrared film is being used.

Also, even when an infrared film is installed, the state of the shutter blade movement can be detected through the regulation of the amount and wavelength of radiation.

In accordance with another aspect of the invention, the camera is equipped with a shutter that controls the duration of the recording medium's exposure to light, a shutter measurement device that measures the time interval during which the shutter exposes the recording medium to light, a power source that supplies electric power to the shutter and the shutter measurement device, a voltage measurement device that measures the voltage produced by the power source, a comparison device that compares the voltage measured by the voltage measurement device with a reference voltage, and a controller that controls the operation or non-operation of the shutter measurement device based on the results of this comparison.

In a camera thus constructed, because the voltage generated by the power source is measured by the voltage measurement device and control of the operation or non-operation of the shutter measurement device is performed to the extent to which the power source (battery) has become discharged, camera malfunctions attributable to the discharged state of the power source are prevented, and reliable photography is achieved.

A method according to the invention is also provided.

DETAILED DESCRIPTION OF PREFERRED EMBODIMENTS

Embodiments of the present invention are described hereafter, with reference to the drawings.

Figure 1:
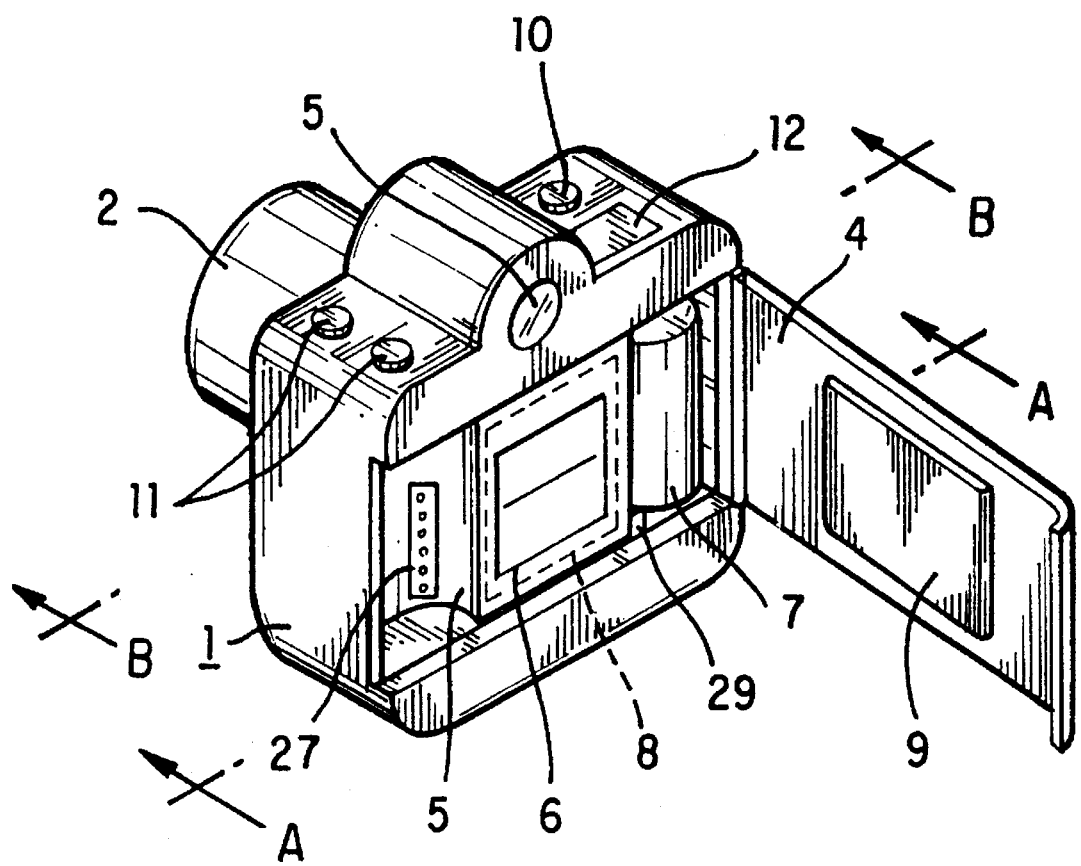
FIG. 1 is perspective view that shows a first embodiment of a camera according to the present invention.

FIG. 1 is a perspective view of a first embodiment of a camera according to the present invention.

In FIG. 1, the rear cover 4 is in the open position, a film cartridge (not shown) is installed into the cartridge chamber 5, and film that is pulled from the cartridge crosses front surface of the aperture 6 and is wound around the spool 7. A pressure plate 9 attached to the inside of the rear cover 4 pushes the film (not shown) against the aperture 6, keeping it flat against the surface.

A film speed detection means 27 reads the code signal given on the side surface of the installed film cartridge. A film indicator switch 29 detects whether or not film is installed in the camera 1. The shutter 8 attached to the inside of the aperture 6 covers a somewhat wider area than that of the aperture 6, which is shown throughout the drawings as a dotted line, and the light from the object being photographed that has passed through the lens 2 is conducted onto the surface of the film for a predetermined length of time.

Through the finder 3, the photographer examines the state of the object being photographed that has passed the lens 2 and directs the commencement of exposure by depressing the release button 10. The exposure mode and various conditions may be confirmed by the display means 12. Within the display means 12 is an LCD (liquid crystal) 34, which will be described hereafter. The plurality of buttons 11 are comprised of operating buttons that optionally set the operation mode and various conditions and are operated while confirming the characters on the display means 12.

Figure 2A:
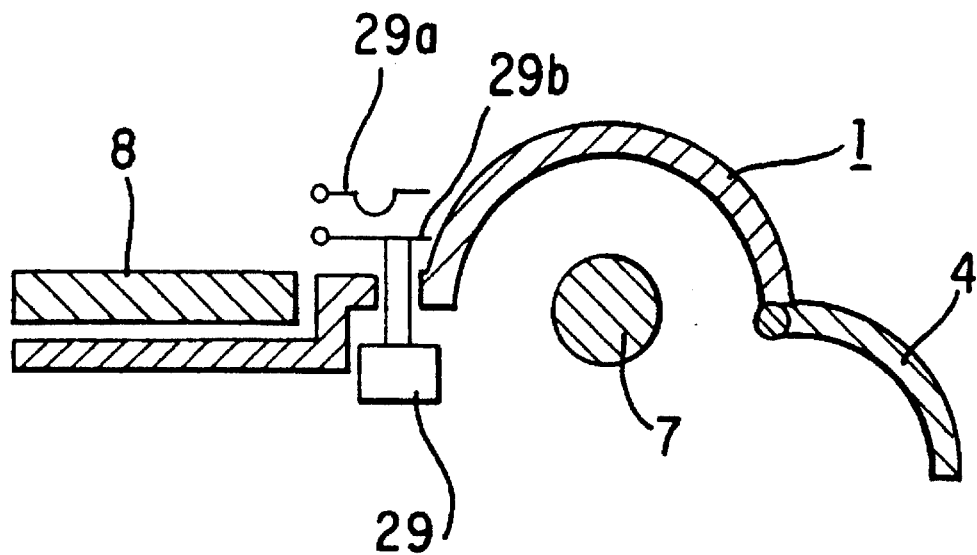
FIGS. 2(a) and 2(b) are component cross sectional views of section A—A in FIG. 1.
Figure 2B:
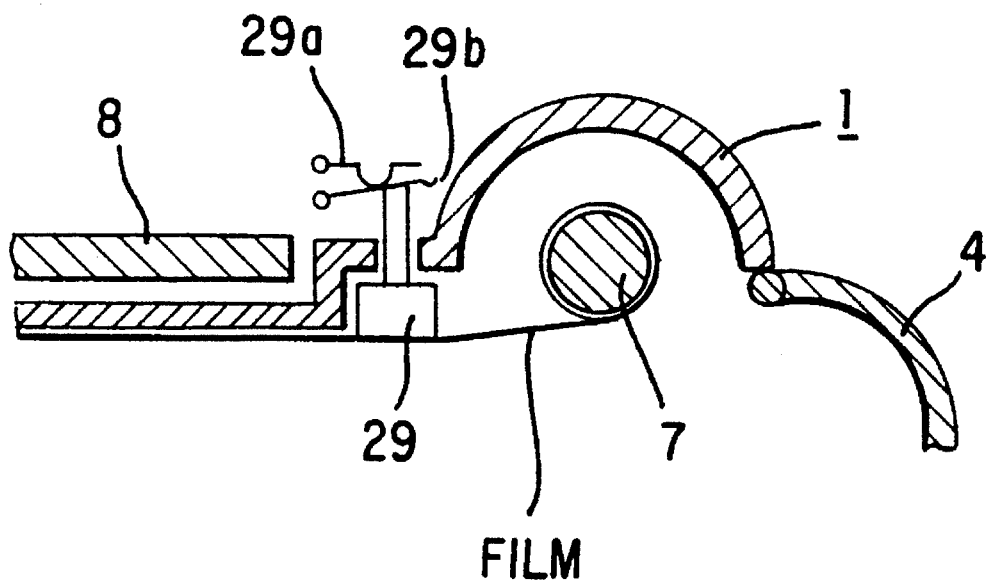

FIGS. 2 (a) and (b) are cross sectional views of section A—A of FIG. 1 and provide a clearer view of the film indicator component 29.

As shown in FIG. 2 (a), when no film is installed in the camera 1, contact 29a is open. As shown in FIG. 2 (b), when film is installed in the camera 1, the film indicator component 29 is depressed by the tensile force of the film's winder, contact 29a contacts contact 29b, and it detects through the change in those conditions whether or not film is present.

Figure 3:
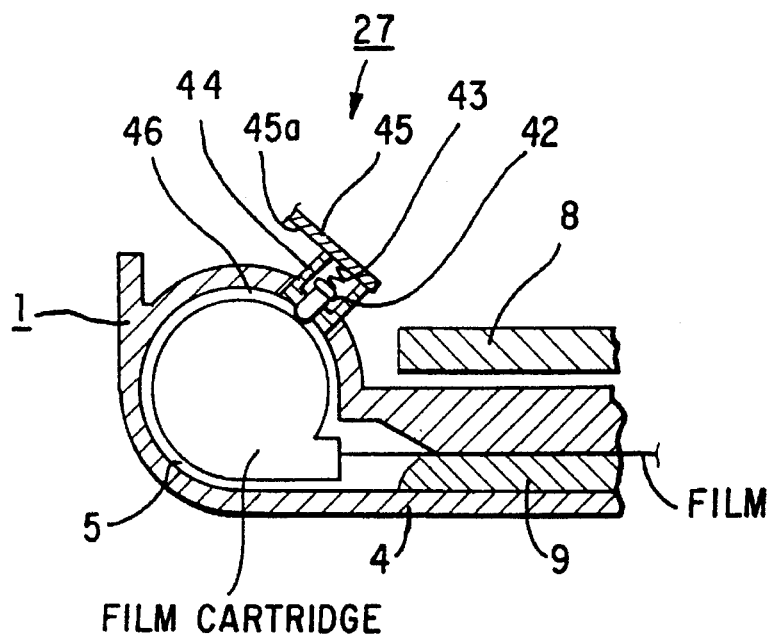
FIG. 3 is a component cross sectional view of section B—B in FIG. 1.

FIG. 3 is a cross sectional view of section B—B of FIG. 1 and provides a clearer view of the film speed detection means 27. A film cartridge is shown installed into the cartridge chamber 5, and the rear cover is shown in the closed state.

A contact pin 42 is inserted into the contact block 44 that is formed in the camera 1, and a print plate 45 is attached to the contact block 44 on the driving side of the contact pin 42. The contact pin 42 is pushed into the cartridge signal component 46 on the side surface of the cartridge by the contact spring 43, which is arranged between the contact pin 42 and the print plate 45. A conducting component (pattern) (not shown) is formed into the rear surface 45a of the print plate 45, the pattern and the contact pin 42 forming an electrical connection through the contact spring 43.

Several of these contacts are lined up in the manner shown in FIG. 1 and are formed so as to read the code signal from the cartridge signal component 46. When a cartridge is installed that has no signal code attached (infrared film), it is determined that the recording medium is an infrared sensitive medium because the contact pin 42 will read a predetermined code signal (such as "0000"). Moreover, because the contact pin 42 will also read the predetermined code signal (such as "0000") when there is no cartridge installed, the film speed detection device 27 cannot determine whether the recording medium is an infrared sensitive medium or whether there is no cartridge installed.

Figure 4:
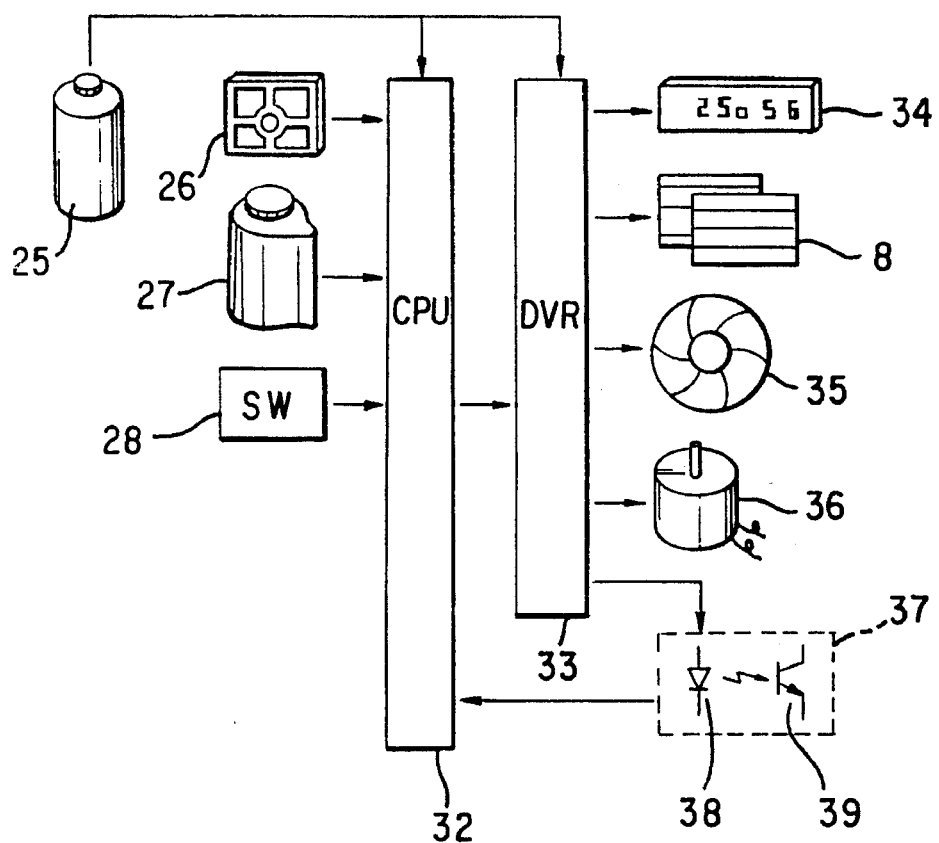
FIG. 4 is a block diagram of the first embodiment.

FIG. 4 is a block diagram that shows a first embodiment of a camera according to the present invention.

The present circuit uses a battery 25 as the power source, and a CPU 32 executes the central control. The signal input to the CPU is as described below.

The light measuring means 26 is a sensor means that measures the brightness of each part of the object being photographed, which has been divided into several parts, and supplies the several light measurement values to the CPU 32. The film speed detection device 27 reads the code signal that is on the side surface of the film cartridge as described above, and supplies the film speed information to the CPU 32. The switch detection means 28 is a manually operated switch that includes a switch that is moved by the release button 10 and the setting buttons 11 as described above, as well as the film indicator component 29 that indicates whether or not film is present. A timing switch is included for detecting the camera's sequence state, wherein information regarding the state of the camera is supplied to the CPU 32 from the switch detection means 28.

The CPU 32 performs the next driving control through the driving means 33.

Information concerning the exposure and operation mode settings and warning indications are displayed on the LCD 34. The shutter 8, specifically the time gap between the operation of the front curtain magnet and the rear curtain magnet, controls the exposure time. The amount of light let in is controlled by driving the diaphragm 35 inside the lens 2.

The CPU 32 drives a motor 36 and controls the driving movement of the shutter driving spring, the film's advancement and rewinding, and the charge of the mirror and diaphragm. Furthermore, the CPU 32 controls the shutter curtain movement detection means 37. As explained in detail hereafter, it actuates the light emitting diode 38 and receives the signal that originates in the photo transistor 39.

Figure 5:
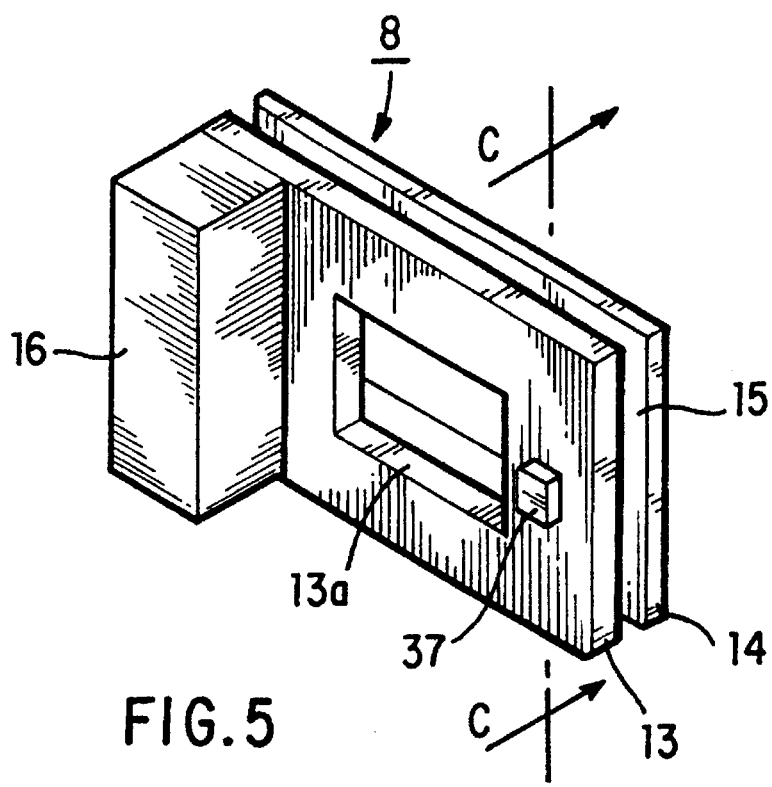
FIG. 5 is a perspective view of a shutter in the first embodiment.

FIG. 5 is an perspective view of the shutter 8. The base plate 13 and the cover plate 14 are arranged virtually parallel with a predetermined gap between them, in which is formed a blade chamber 15. An opening 13a is provided for exposure, the opening 13a being formed in the base plate 13 in the position that is virtually the same as that of the aperture 6 of camera 1. An opening (not shown) is also provided in the cover plate 14, in virtually the same position. A drive mechanism 16 includes a shutter blade spring and is comprised of a shutter mechanism for controlling the exposure time. Drive mechanism 16 includes an electromagnet. A charging mechanism for charging the driving mechanism is included in the shutter mechanism component of drive mechanism 16. On the side of the opening 13a opposite the shutter mechanism component of drive mechanism 16, a shutter curtain movement detection means 37 is attached to the base plate 13.

Figure 6:
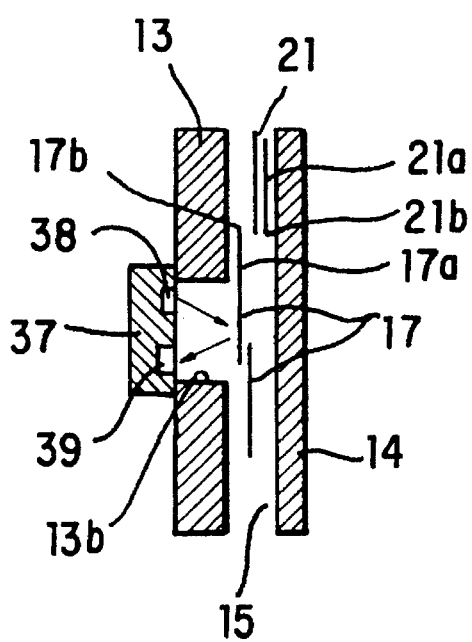
FIG. 6 is a cross sectional view of section C—C in FIG. 5.

FIG. 6 is a cross sectional view of section C—C of FIG. 5. In the blade chamber 15, a front blade group 17 and a rear blade group 21 are arranged so as to be able to move between a position that covers the opening 13a (FIG. 5) and a position that opens the opening. The shutter curtain movement detection means 37 has a light emitting diode 38 and a photo transistor 39 and detects the location of the front blade group 17 and the rear blade group 21 through the inspection hole 13b that is formed in the front surface base plate of the shutter curtain movement detection means 37. In other words, when the front blade group 17 or the rear blade group 21 are in the illustrated positions, the light from the light emitting diode 38 shines on the photo transistor 39 after it shines on the front blade group 17 or the rear blade group 21, but when blades are not present, the light is not reflected to the photo transistor 39. Thus, the shutter curtain movement detection means 37 detects the disposition of the front blade group 17 and the rear blade group 21.

In order to commence exposure, the front blade group 17 in the state shown in FIG. 6 is driven from a position covering the opening 13a to a position that opens it. When the slit edge 17b of the slit forming blade 17a comes to the position of the shutter curtain movement detection means 37, the output of the photo transistor 39 is turned from low level to high level, and, in order to end the exposure, the rear blade group 21 is driven from a position in which the opening 13a is opened to a position that covers it. When the slit edge 21b of the slit forming blade 21a comes to the position of the shutter curtain movement detection means 37, the output of the photo transistor 39 is turned from the high level to the low level. Part of the light from the light emitting diode 38 reaches the installed film because, as shown in FIG. 5, the detection means is arranged in close proximity to the opening 13a.

Figure 7:
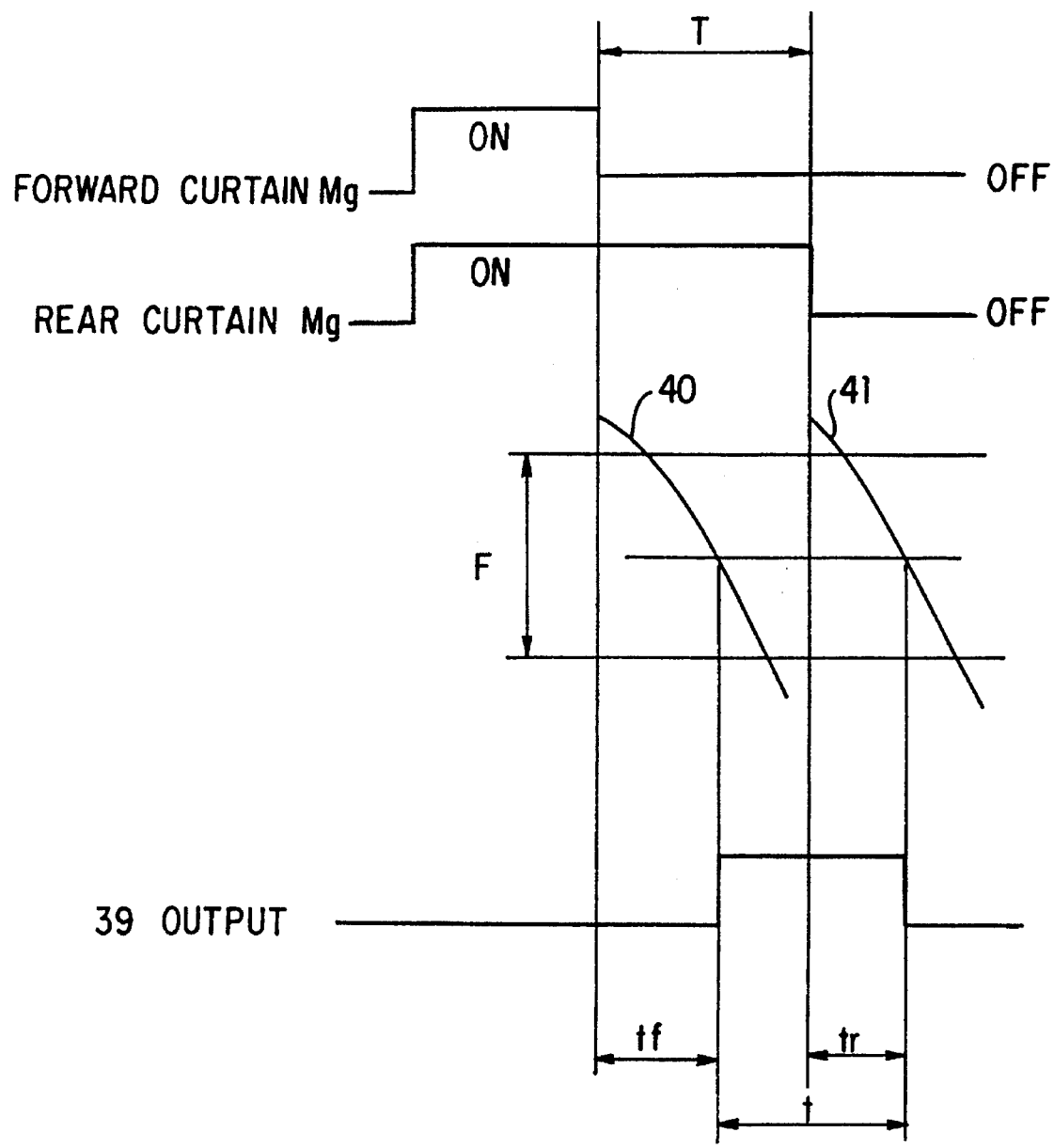
FIG. 7 is a timing chart in accordance with the first embodiment.

FIG. 7 is a timing chart that shows the operation of the shutter 8 described above, and shows the on/off timing of the magnets that control the front and rear curtains, the movement state of the front and rear curtains, and the detection signal of the photo transistor 39.

When the release button 10 (FIG. 1) is depressed, the front curtain magnet and the rear curtain magnet are turned on, and the electrical connections of the front and rear curtains begin. The mechanical connection maintained before the release button was depressed is switched off. During the subsequent photography, the control of the diaphragm of the lens 2 is first executed through the operation of a mechanism (not shown), and the reflecting mirror (not shown) of the photographic light circuit is raised. Next, the front curtain magnet is turned off, and the slit edge 17b of the slit forming blade 17a of the front blade group 17 moves as shown by the curved line 40. Here, the limits shown by F indicate the lengthwise opening of aperture 6. After the front curtain magnet has been turned off and time tf has passed, the photo transistor 39 outputs a signal when the slit edge 17b of the front blade group 17 has passed the front surface of the shutter curtain movement detection means 37.

After the front curtain magnet has been turned off, the rear curtain magnet is turned off after the passage of time interval T, which comprises the predetermined exposure time. Through this, the slit edge 21b of slit forming blade 21a of the rear blade group 21 moves as shown by the curved line 41. Here, too, after the rear curtain magnet has been turned off and the time tr has passed, the photo transistor 39 outputs a signal when the slit edge 21b of the rear blade group 21 has passed the front surface of the shutter curtain movement detection means 37.

If the time t of the return timing of the photo transistor 39 obtained as described above is measured from rise to fall, the true exposure time was t. If the regulating time t obtained from the photo transistor 39 is different from the exposure time T even though the exposure regulating circuit (not shown) times the exposure time T correctly and drives the front and rear curtain magnets at the correct timing, it can be determined that there has been a faulty operation of the mechanical connection.

Furthermore, if these times tf and tr are each timed, the front and rear curtain movement times (curtain speeds) can be determined. When the times tf and tr are longer than a standard value, it can be determined that the curtain movements are slow, and conversely, when they are shorter than the standard value, it can be determined that they are fast. It is also possible to determine exposure irregularities.

Table 1 is a table that matches the output conditions of the film speed detecting means 27 and the film indicator component 29, which indicates whether or not film is present. A reading of "present" on the film speed detecting means 27 shows that a cartridge with a code signal is installed and that the film speed information can be read. A reading of "not present" shows either that no cartridge is installed or that a cartridge without a code signal (infrared film) is installed, or in other words, that a code signal of "0000" will be shown, as described above. Meanwhile, a reading of "present" on the film indicator component 29 shows that the film indicator component 29 is conducting, that the film is being pulled from the cartridge, and that exposure is possible; while a reading of "not present" shows that the film indicator component 29 is not conducting and that no film is installed.

Film that is marketed for general photography, with speeds within the visible spectrum (usually wavelengths 400 nm–700 nm), has a code signal on the side surface of the cartridge. Infrared film, with speeds within the infrared spectrum (wavelengths above 700 nm), has no code signal and is covered with an insulated coating surface. Thus, the film speed detecting means 27 detects the predetermined code signal "0000" described above. The reason that there is no code signal attached is that the speed limit of the light measuring means 26 of the camera 1 is set within the visible range, and since it has no speed within the infrared range and is incapable of measuring it, it would be meaningless to attach a code signal to an infrared film cartridge. This holds true for other cameras in general and is not peculiar to the camera of the present invention. Also, general photographic film will not become sensitized even when illuminated by light from the light emitting diode 38 (infrared light with a wavelength of approximately 920 nm) because it is not infrared light sensitive, but infrared film will end up becoming sensitized because it is infrared light sensitive.

TABLE 1

|  | Film Speed Detection Means | |
|---|---|---|
|  | Present | Not Present |
| Film Indicator Component Present | Case 1 | Case 3 |
| Film Indicator Component Not Present | Case 2 | Case 4 |

Table 1 is explained below.

Case 1 is the state in which a general photographic film cartridge is installed, and the film is also installed. In this instance, even if the light emitting diode 38 is caused to radiate, the film will not become sensitized and the shutter curtain movement detection means 37 is operable.

Case 2 is the state in which a general photographic film cartridge is installed, but in which the film is not installed. In this instance the shutter curtain movement detection means 37 is operable.

Case 3 shows a state in which an infrared film cartridge is installed, and the infrared film is also installed. Therefore, when the light emitting diode 38 is caused to radiate, since its infrared light will sensitize the infrared film, the shutter curtain movement detection means 37 cannot be operated.

Case 4 shows either a state in which no cartridge is installed or in which an infrared film cartridge is installed, but in which the film itself is not installed. Therefore, the shutter curtain movement detection means 37 can be operated.

As described, only in Case 3 can the shutter curtain movement detection means 37 not be operated, and it can be operated in the other cases.

Figure 8:
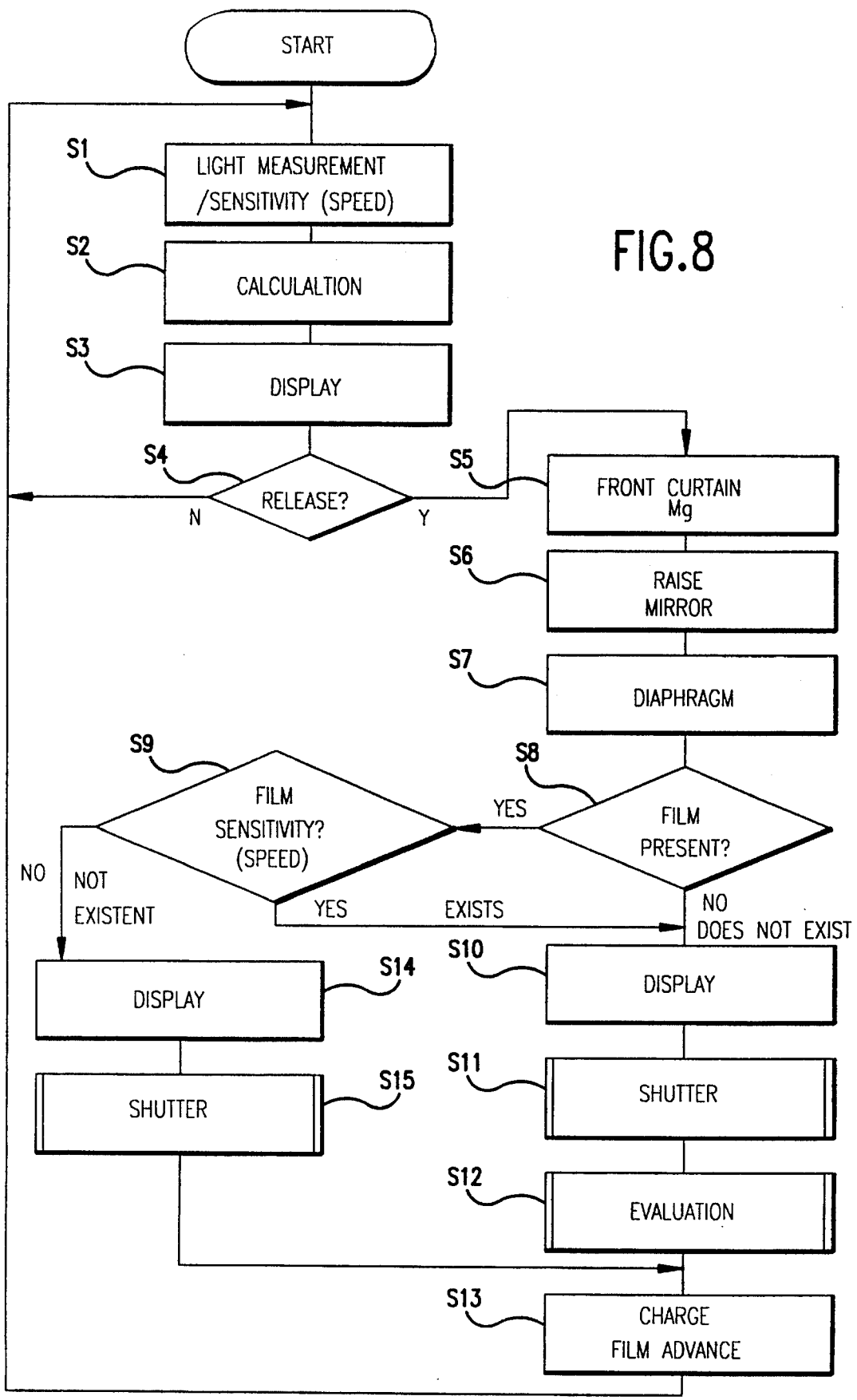
FIG. 8 is a flowchart that shows the execution routine of the camera according to the first embodiment.

FIG. 8 is a flow chart that shows the execution routine of the CPU 32 in FIG. 4. This routine executes repeatedly while electricity is supplied. In step S 1, the light measuring signal from the light measuring means 26 and the speed information from the film speed detection means 27 are read. In step S 2, each is calculated and the shutter time and the stop value that are the proper exposure conditions are calculated. If there is no exposure information, the photographer sets a shutter time and stop value. In step S 3, the exposure conditions found above are displayed by the LCD 34.

In step S 4, a determination is made by the switch detection means 28 as to whether or not the release button 10 has been depressed. If it has not been depressed, the operation returns to step S 1, and the above operation is repeated. If the release button has been depressed, the front and rear curtain magnets are turned on in step S 5, as explained in FIG. 7.

In step S 6, the reflecting mirror (not shown) is raised and withdrawn from the photographic circuit. In step S 7, the diaphragm is regulated to a set the diaphragm opening. In step S 8, the state of the film detecting component 29 is detected through the switch detection means 28. When it is on (i.e. when the film is installed), the process proceeds to step S 9, and when it is off (when no film is installed), the process proceeds to step S 10.

If the film is not installed in step S 8, or if the speed information has not been taken in step S 9, the shutter curtain movement detection means 37 is operated in step S 10, and the LCD 34 indicates that a shutter time check is being performed. In step S 11, the shutter 8 is opened, and the shutter control routine that controls the exposure to the film and the shutter curtain movement state detection routine done by the shutter curtain movement detection means 37 are executed. The details of the shutter control routine and of the shutter curtain movement state detection routine will be explained hereafter, with reference to FIGS. 9 and 10.

In step S 12, an evaluation is made of the timing data detected by the shutter curtain movement detection means 37. Details regarding the timing evaluation routine will be explained hereafter, with reference to FIG. 11. In step S 13, the motor 36 is rotated after the exposure action has been completed, the mechanism is charged and the film wound, and the operation returns to step S 1, repeating the steps described above.

If it is determined in step S 9 that the speed information from the film speed detection means 27 has not been taken in, the LCD 34 indicates that the shutter curtain movement detection means 37 will not be operated in step S 14 because the speed information has not been taken in step S 9.

In step S 15, the shutter control routine that opens and closes the shutter 8 and controls the film exposure is executed. The details of the shutter control routine will be explained hereafter in relation to FIG. 12. After completion of step S 15, the operation proceeds to step S 13, rotating the motor 36, charging the mechanism and winding the film, whereupon the operation returns to step S 1, and the operation described above is repeated.

Figure 9:
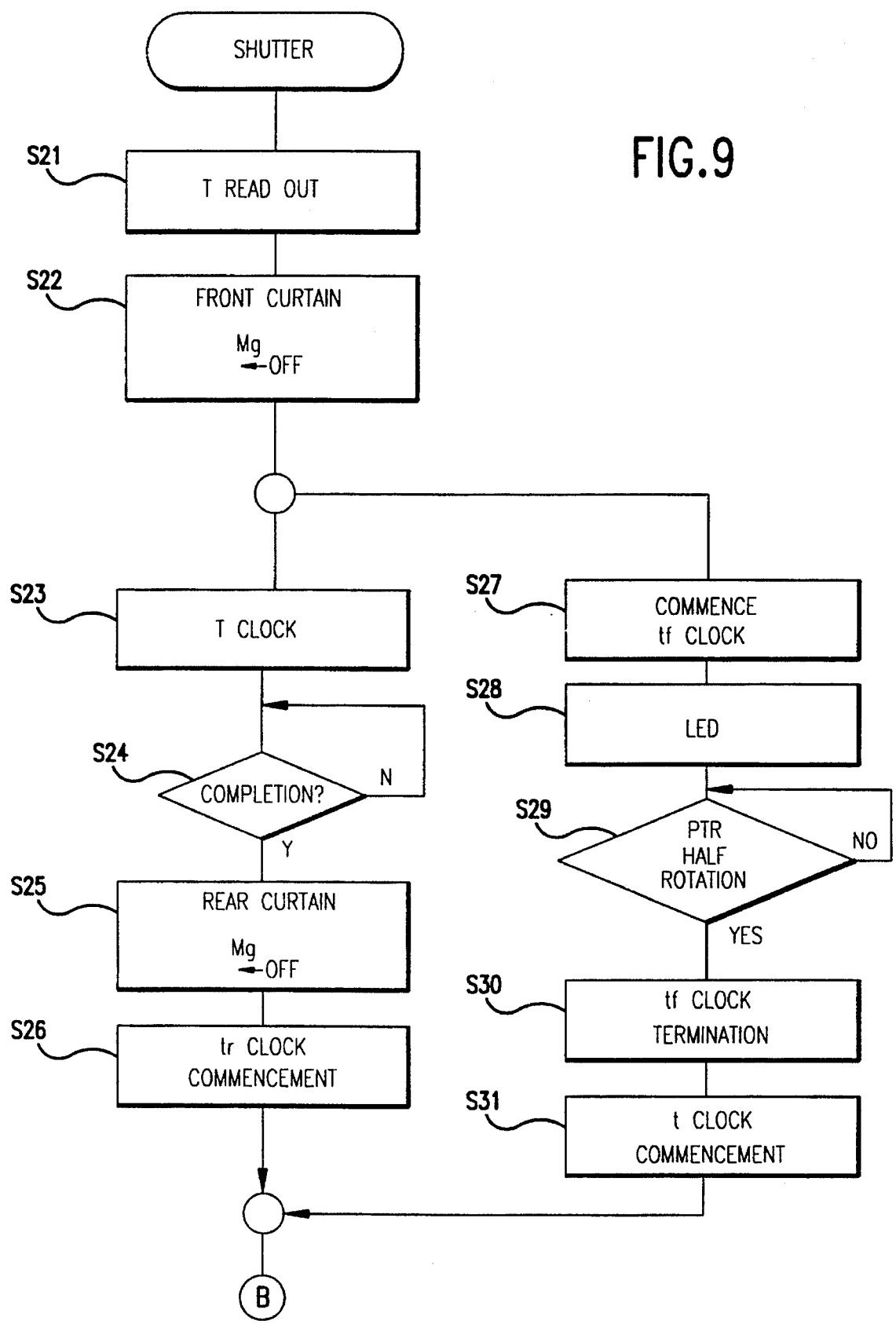
FIG. 9 is a flowchart illustrating a shutter control routine of the first embodiment.
Figure 10:
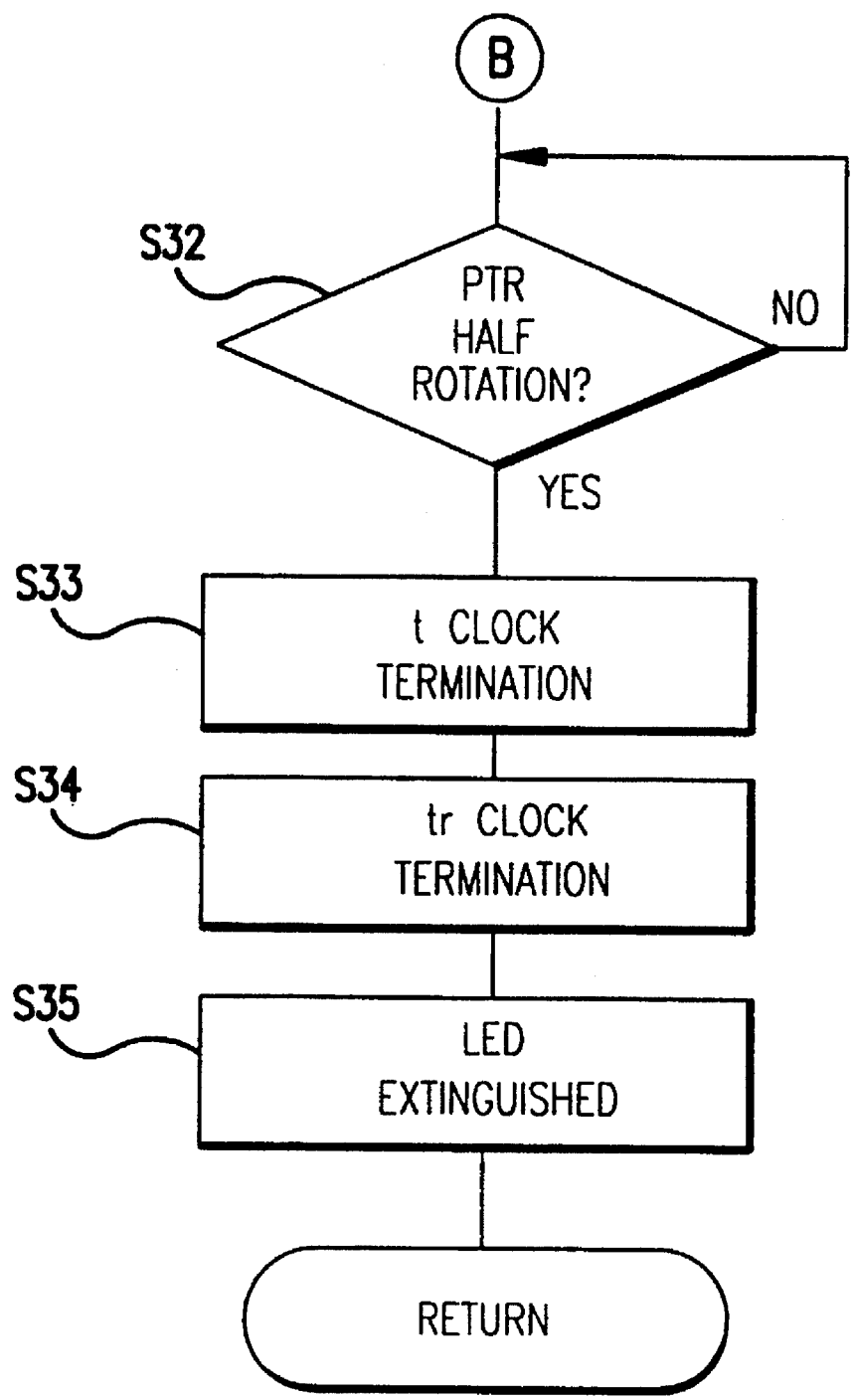
FIG. 10 is a flowchart illustrating a shutter control routine of the first embodiment.

FIGS. 9 and 10 are flow charts that explain the details of the shutter control routine and of the shutter curtain movement detection routine in step S 11. In step S 21, the shutter time T set in step S 2 (FIG. 8) is read. In step S 22, the electric current to the front curtain magnet is terminated, and movement of the front blade group 17 commences. Subsequently, steps starting from step S 23 and from step S 27 are executed simultaneously. In order to make the description accurate, the present embodiment uses, for example, the case in which the shutter time T is sufficiently longer than the movement time of each blade group.

In step S 23, the timing of the shutter time T begins. In step S 24, the operation waits until the completion of the timing of the shutter time T. In step S 25, the electrical current to the rear curtain magnet is terminated because the shutter time T has passed, and the movement of the rear blade group 21 is commenced. In step S 26, the timing of the measured time tr is commenced.

In step S 27, the timing of the measured time tf commences at the same time as step S 23. In step S 28, the light emitting diode 38 is caused to shine. In step S 29, there is a wait for the return of the output of the photo transistor 39 through the passage of the slit edge 17b of the front blade group 17. In step S 30, the timing of the measured time tf is terminated. In step S 31, timing of the measured time t is commenced.

In step S 32 (FIG. 10), there is a wait for the return of the output of the photo transistor 39 through the passage of the slit edge 21b of the front blade group 21. In step S 33, the timing of the measured time t is terminated. In step S 34, the timing of the measured time tr is terminated. In step 35, the light emitting diode 38 ceases to shine because the measuring has ceased, and the operation returns to step S 12 of FIG. 8.

Figure 11:
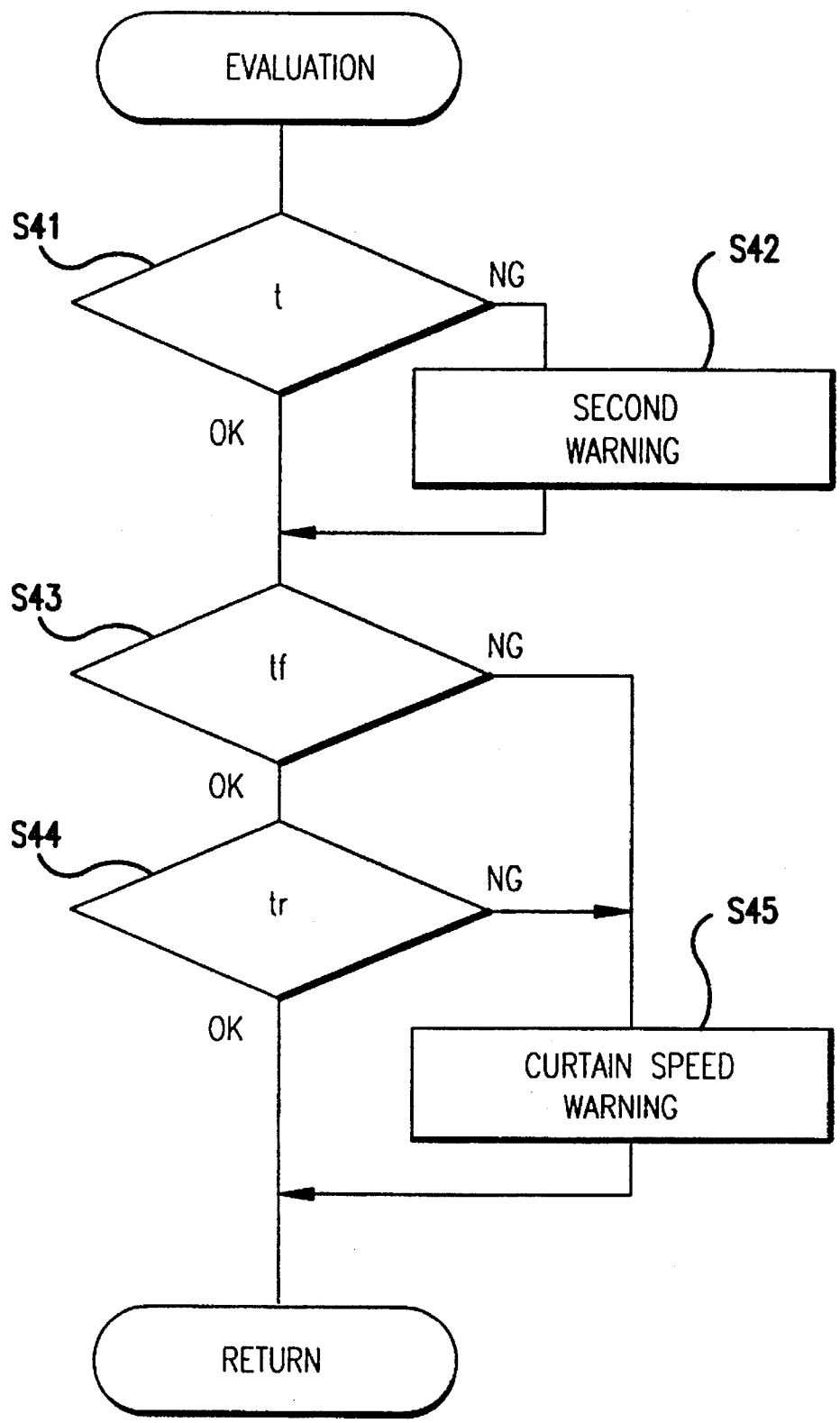
FIG. 11 is a flowchart that shows a timing data evaluation routine of the first embodiment.

FIG. 11 is a flow chart that explains the details of the timing data evaluation routine (step S 12 of FIG. 8).

In step S 41, it is determined whether or not the measured time t is within the predetermined allowable limits, which have been set with reference to the shutter time T. If it deviates from the allowable limits, a timing warning is carried out in step S 42. This warning shows that the exposure time has not satisfied the set value. In step S 43, a determination is made as to whether or not the movement time tf of the shutter blade group 17 is within the set limits. If it is determined to be within the set limits, the operation proceeds to step S 43. If it is determined to deviate from the set limits, the process moves to step S 45, wherein a warning is given if either the movement time tf or tr of the front curtain group 17 or the rear curtain group 21 has deviated from the allowable limits.

In step S 44, a determination is made as to whether or not the movement time tr of the shutter blade group 21 is within the set limits. If it is determined to be within the set limits, there is a return to step S 13 (FIG. 8). If it is determined that there is a deviation from the set limits, the process moves to step S 45.

Figure 12:
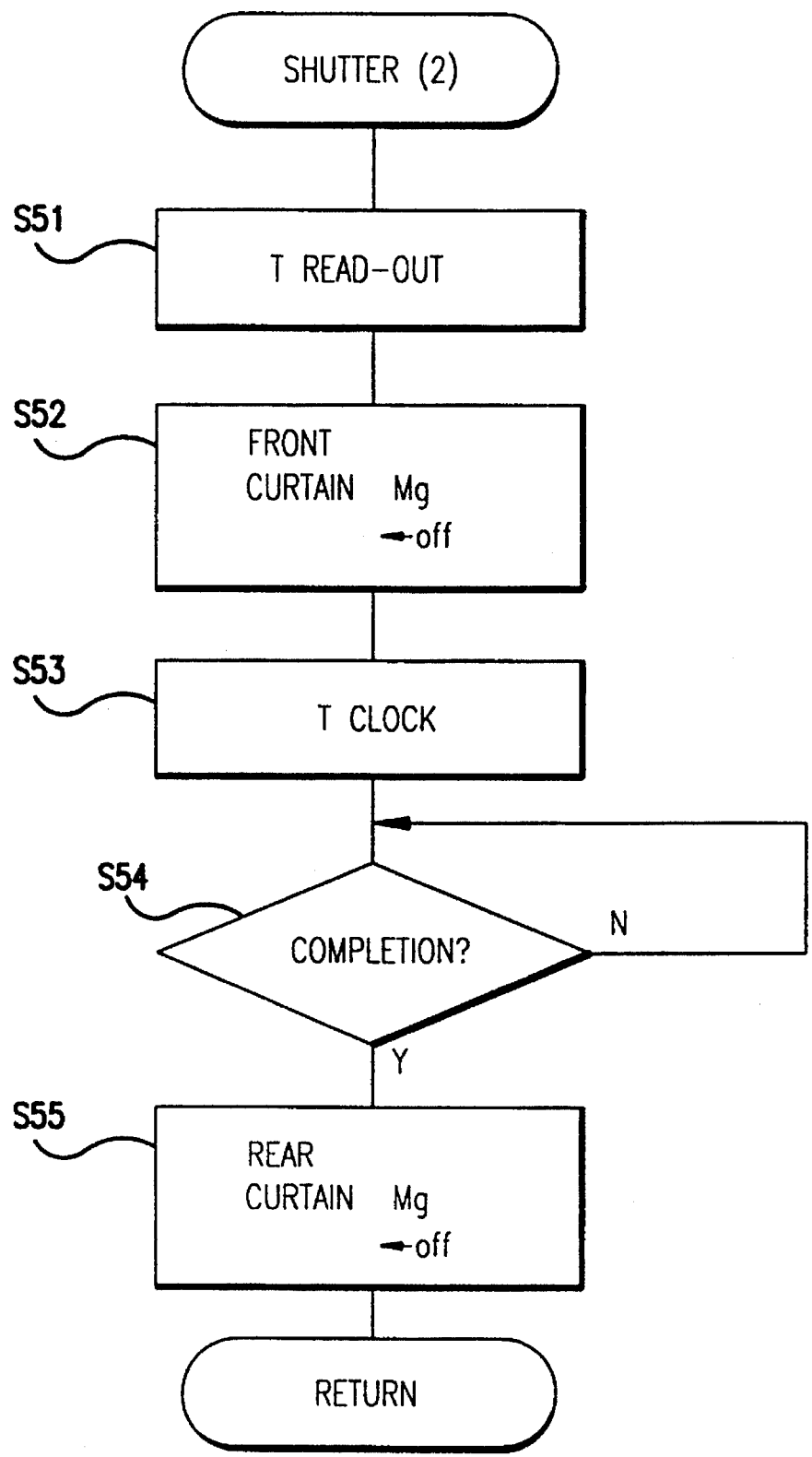
FIG. 12 is a flowchart that shows a shutter control routine of the first embodiment.

FIG. 12 is a flow chart that explains the details of the shutter control routine (step S 15 of FIG. 8), in which the measurement function of the shutter measuring routine described in FIGS. 9 and 10 is omitted, and regulation is accomplished of only the shutter timing.

In step S 51, the shutter time T set in step S 2 (FIG. 8) is read. In step S 52, the current to the front curtain magnet is terminated, causing the front curtain blade 17 to commence movement. In step S 53, the timing of the shutter time T is commenced. In step S 54, there is a wait for the completion of the timing of the shutter time T.

When the shutter time T has passed, the electrical current to the rear curtain magnet is terminated in step S 55, and the movement of the rear blade group 21 commences. Next, there is a return to step S 13 of FIG. 8.

An explanation of the relationship between Table 1 and the camera execution routine in FIG. 8 follows. In FIG. 8, steps S 8 and S 9 determine the condition of Table 1. In step S 8 of FIG. 8, it is determined whether or not the film is installed. If it is not installed, the results of Case 1 or Case 2 are shown in Table 1. Whichever case results, the shutter curtain movement detection device 37 is operated, as described above, and the process moves on to step S 10 because the shutter time can be examined. On the other hand, if the film is installed, the process moves on to step S 9, where a determination is made as to whether or not Case 1 or Case 3 has occurred.

In step S 9, if the speed information taken in Case I exists, the program goes to step S 10 because the shutter curtain movement detection device 37 can be operated and the shutter time examined. On the other hand, if there is no speed information from Case 3, the process goes to step S 15, wherein the detection means is not operated and only the shutter is operated, performing the exposure control.

Figure 13:
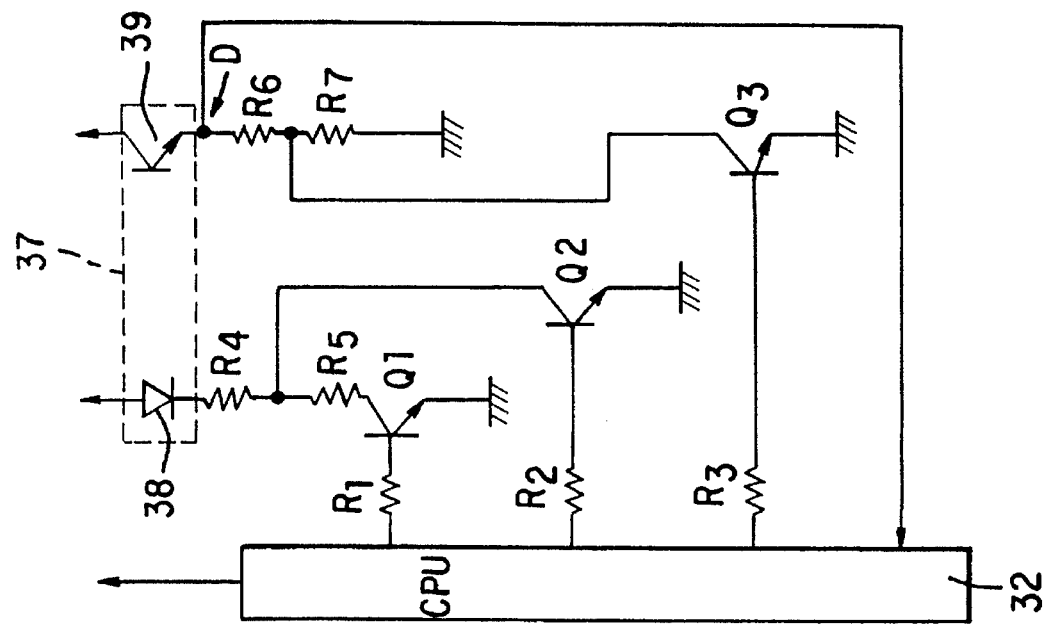
FIG. 13 is a circuit diagram that shows a second embodiment of a camera according to the present invention.

FIG. 13 is a second embodiment of the current invention, illustrating a circuit diagram of the components relating to the light emission and reception of the shutter curtain movement detection means 37. This second embodiment is constructed so as to decrease the amount of light radiated by the light emitting diode 38 of the shutter curtain movement detection means 37 when infrared film is installed, and is able to measure, as well as raise, the light receiving speed of the photo transistor, preventing the sensitization of the infrared film. Moreover, the construction is the same as that of the primary embodiment.

In FIG. 13, R 1–R 7 are resistors and Q 1–Q 3 are transistors. The CPU 32 turns on each transistor Q 1Q–Q 3 by sending a high level current through the resistors R 1–R 3 to the base of each corresponding transistor Q 1–Q 3. In other words, the path between the collector and emitter of the transistor becomes conductive. Also, the transistors Q 1–Q 3 are turned off by sending a low level current to their bases. In other words, the path between the collector and emitter of the transistor becomes non-conductive.

Table 2 shows the on/off relationship of the transistors Q 1–Q 3 when normal film is used (this also includes the case in which no film is installed) and when infrared film is used.

TABLE 2

|  | Q1 | Q2 | Q3 |
| --- | --- | --- | --- |
| Normal Film | OFF | ON | ON |
| Infrared Film | ON | OFF | OFF |

When normal film is used, the electrical current that passes through the light emitting diode 38 only passes through the resistor R 4 because Q 1 is off and Q 2 is on. When infrared film is used, the electrical current that passes through the light emitting diode 38 passes through resistors R 4 and R 5 because Q 1 is on and Q 2 is off. Therefore, when infrared film is used, the electrical current diminishes, and the amount of light emitted from the light emitting diode 38 decreases. On the other hand, when normal film is used, the resistor R 6 is the only thing grounded to point D because Q 3 is on; but when infrared film is used, R 6+R 7 are grounded to point D because Q 3 is off.

Therefore, when infrared film is used, the electric potential of point D relating to the output electrical current of the transistor 39 becomes higher than in the case of the normal film and the light receiving speed increases.

Figure 14:
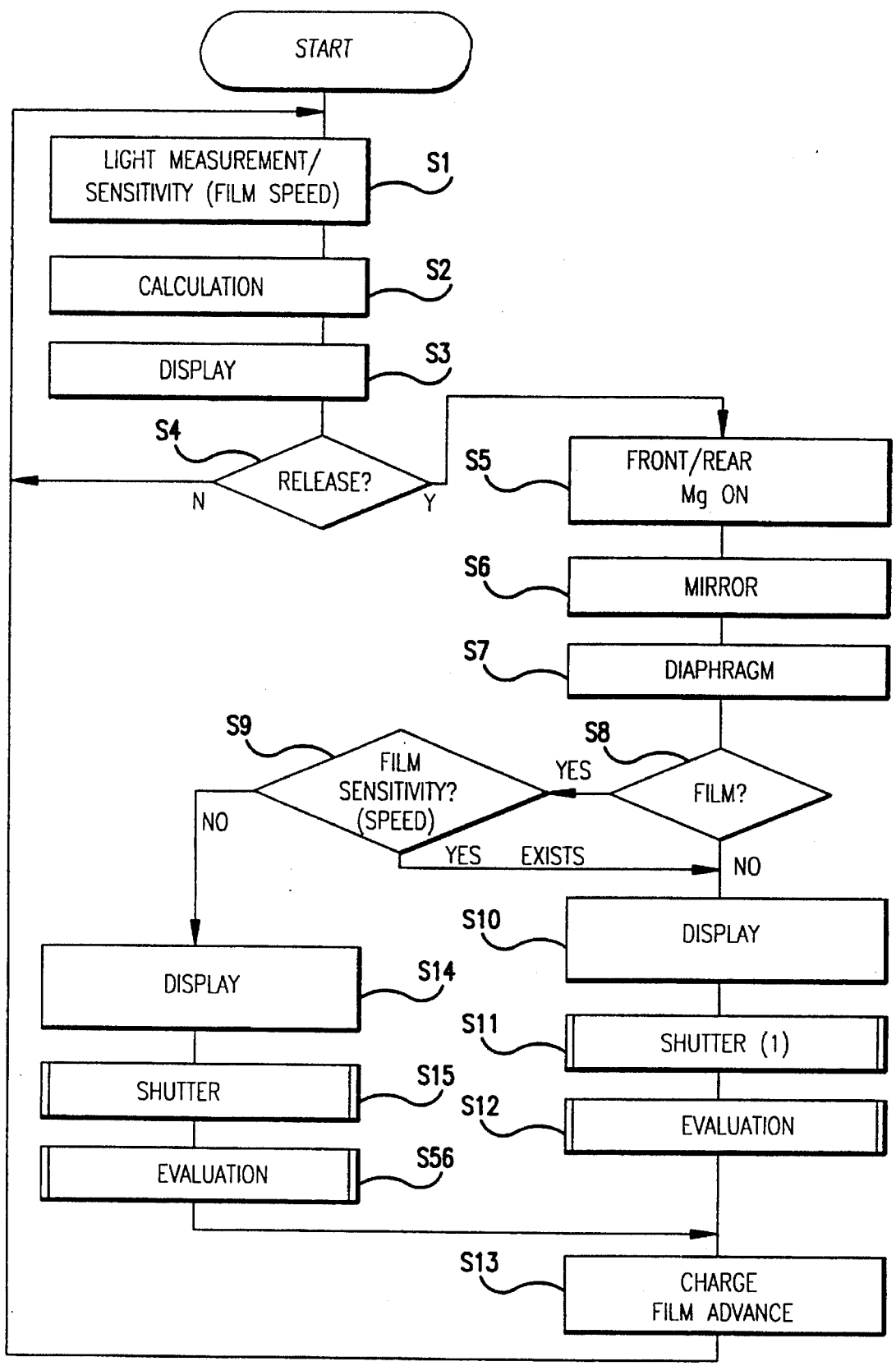
FIG. 14 is a flow chart that shows the operation execution of the second embodiment.

FIG. 14 is a flow chart that corresponds to the operation of the second embodiment. When compared to the flow chart shown in FIG. 8, it has a supplemental step S 56, but is otherwise constructed in the same manner. Furthermore, step S 56 executes the evaluation routine shown in FIG. 11 in the same manner as step S 12. Also, the shutter routine of step S 15 executes the shutter routine shown in FIGS. 9 and 10, but sets transistors Q 1–Q 3 in the on/off state in the infrared film case of Table 2. On the other hand, in the case of the shutter routine of step S 11, transistors Q 1–Q 3 are set in the on/off relationship of the normal film state of Table 2.

Through the construction described above, the same operation occurs in both the case of normal film and of infrared film, but when infrared film is used, the amount of light radiated by the light emitting diode 38 is decreased, and the light receiving speed of the photo transistor 39 is increased.

Figure 15:
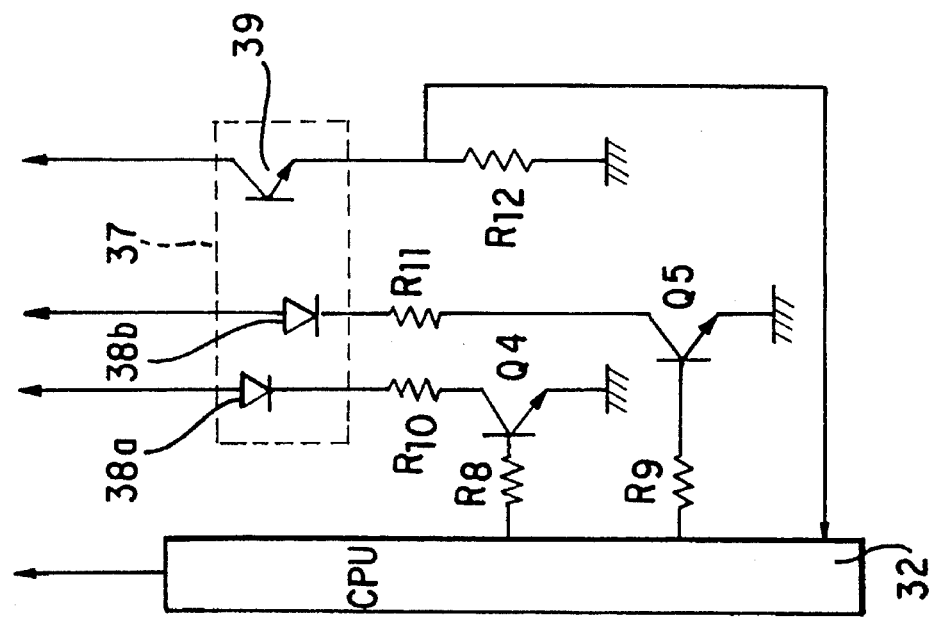
FIG. 15 is a circuit diagram that shows a third embodiment of a camera according to the present invention.

FIG. 15 is a circuit diagram that shows a third embodiment of the present invention. It is equipped with two light emitting diodes 38a and 38b of differing wavelengths in the radiating component of the shutter curtain movement detection means. This third embodiment will, for example, have light emitting diode 38a with a wavelength in the infrared spectrum and light emitting diode 38b with a wavelength in the visible spectrum. This embodiment causes the light emitting diode 38b to shine when an infrared film is installed and causes the light emitting diode 38a to shine in all other cases, at least causing the wavelength of the installed film to be different and thereby preventing the sensitization of the film. Furthermore, the construction of the camera 1 is the same as that of the primary embodiment.

In FIG. 15, R 8–R 12 are resistors and Q 4 and Q 5 are transistors. The CPU 32 turns on transistor Q 4 by sending a high level current to the base through resistor R 8 and Q 5 by sending a high level current to the base through resistor R 9. In other words, the path between the collector and emitter of the transistor becomes conductive. Also, the transistors Q 4 and Q 5 are turned off by sending a low level current to their bases. In other words, the path between the collector and emitter of the transistor becomes non-conductive.

Table 3 shows the on/off relationship of the transistors Q 4 and Q 5 when normal film is used (this also includes the case in which no film is installed) and when infrared film is used.

TABLE 3

|  | Q4 | Q5 |
| --- | --- | --- |
| Normal Film | ON | OFF |
| Infrared Film | OFF | ON |

When normal film is used, light emitting diode 38a shines and light emitting diode 38b does not shine because transistor Q 4 is on and transistor Q 5 is off. Thus, the wavelength of the resulting radiation is in the visible spectrum. On the other hand, when infrared film is used, light emitting diode 38a does not shine and light emitting diode 38b shines because transistor Q 4 is off and transistor Q 5 is on. Thus, the wavelength of the resulting radiation is infrared.

The flow chart in FIG. 14 can be applied to the operation of this third embodiment. However, when the shutter routine of step S 11 is executed, transistors Q 4 and Q 5 are set in the on/off relationship of normal film in Table 3, and when the shutter routine of step S 15 is executed, transistors Q 4 and Q 5 are set in the on/off relationship of infrared film in Table 3.

Through the construction described above, at least the speed limit of the installed film and the wavelength of the light emitting diode can be made to be different, and the sensitizing of the film can be prevented. Furthermore, other methods of altering the radiation wavelength like the one described above may also be applied. For example, it is also possible to construct the device so that a band pass filter is used, which has a wavelength range that may be penetrated by both the infrared range and the visible range. The filter would be switched according to the type of film installed.

As described above, using the present invention, the problem of infrared film becoming sensitized can be prevented because it is constructed so that the shutter blade movement state detection means is not operated when infrared film is being used. This is accomplished through a suppressing means that suppresses the operation of the shutter measurement means when the discerning means discerns that the recording medium is an infrared medium.

Figure 16:
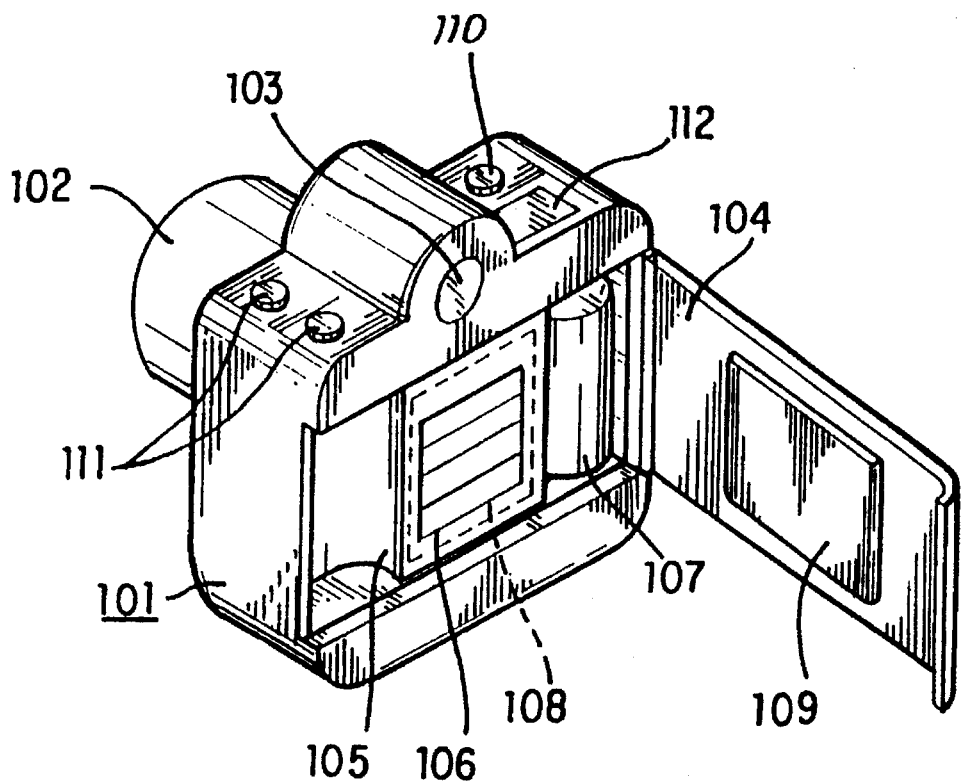
FIG. 16 is a perceptive view of a fourth embodiment of a camera according to the present invention.

FIG. 16 is a perspective view of a fourth embodiment of a camera in accordance with the present invention. In FIG. 16, the back lid 104 is shown in its open state. A film cartridge, not shown in the drawing, is inserted into the cartridge chamber 105, and film from the cartridge is passed across the surface of the aperture 106 and wound on the spool 107. The pressure plate 109 provided on the inside of the back lid 104 serves to keep the film flat by pressing it against the aperture 106.

On the inside of the aperture 106 is provided a shutter 108, explained hereafter. The shutter 108 covers an area slightly larger than the aperture 106, as indicated by the broken lines within the drawing, and light from the subject that has passed through the lens 102 is guided to the surface of the film for a specified time interval. The photographer ascertains the state of the subject seen in the lens 102 by means of a view finder 103 and commands the initiation of exposure by depressing the release button 110.

The exposure mode and various warning indications can be verified using the LCD 112, which is composed of a photo-optical means such as a liquid crystal (LCD). The several setting buttons 111 are used to arbitrarily set the operating mode and photographic conditions of the camera 101, the operations being performed and verified through the display of figures on the LCD 112.

Figure 17:
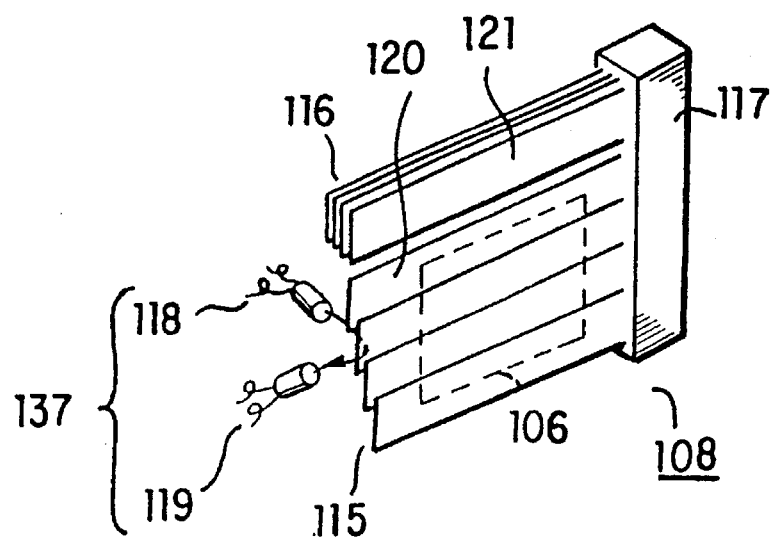
FIG. 17 is a perspective view of the shutter used in the fourth embodiment.

FIG. 17 is a perspective view of the shutter 108 used in a camera according to the present invention. In this instance, the shutter 108 and aperture 106 will be explained as though extracted from the camera in order to show only the relative positions of the shutter 108 and the aperture 106 in the camera 101 shown in FIG. 16.

FIG. 17 shows the state prior to the depressing of the release button 110, i.e. the condition prior to the initiation of an exposure. In this case the aperture 106 indicated by the broken lines is covered by the front curtain 115, which is generally composed of several flaps. The front curtain 115 is composed of four flaps, such as is shown in FIG. 17. When in a state covering the aperture 106, the flaps are spread so that only a small portion of each flap overlaps an adjacent flap. The top most flap 120 of the front curtain 115 is the flap that forms the slit.

Similarly, the rear flap 116 is composed of several flaps, and in the state shown in FIG. 17, these flaps are held folded above the aperture 106. The bottom most flap 121 of the rear curtain 116 is the flap that forms the slit, and its joint movement together with the front curtain slit-forming flap 120 creates the slit that allows the film to be exposed for the desired shutter time.

Block 117 is a component that contains the springs used to move the curtains, as well as the front curtain magnet and the rear curtain magnet, and basically contains such well-known structures as the two electromagnets that independently control the curtains, the two spring systems that cause movement of the curtains, and the link structure that causes each flap to move up or down in a parallel manner.

Starting with the state shown in FIG. 17, the exposure action is performed as follows:

First, the front curtain magnet, not shown in the drawing, releases the front curtain 115. By this means the front curtain 115 withdraws from the aperture 106 downward (toward the bottom of FIG. 17) and folds up at the bottom, the slit-forming flap 120 being the last to withdraw. The aperture 106 is thus freed of all obstacles blocking light from the subject, and the film exposure commences.

Furthermore, after a specified time interval has elapsed, the rear curtain magnet (not shown), releases the rear curtain 116, whereupon the rear curtain moves downward from the position shown in FIG. 17 so as to cover the aperture 106. At the same time, the slit-forming flap 121 is the first of the rear curtain flaps to move, and the aperture now becomes covered by the rear curtain 116, completing the preset time interval of exposure.

After exposure has been accomplished in the manner indicated, the film is advanced one frame by means of a winding structure (not shown) thereby moving an unexposed portion of the film to coincide with the aperture 6, the front curtain 115 and rear curtain 116 being raised upward and returned to their pre-exposure states. Within the shutter 108, a shutter movement detection means 137 composed of an LED 118 and a PTR 119 is displaced so as to be positioned near the tips of the flaps of the front curtain 115 and the rear curtain 116. When the front curtain 115 or the rear curtain 116 are at the same position as light from the LED 118, the light is reflected by the flaps and strikes the PTR 119.

Conversely, when the flaps are not in this position, i.e. during exposure, no light is incident on the PTR 119. Accordingly, by determining the output of the PTR 119, it is possible to detect whether or not light is incident on the PTR 119, i.e. to detect the actual duration of an exposure.

Figure 18:
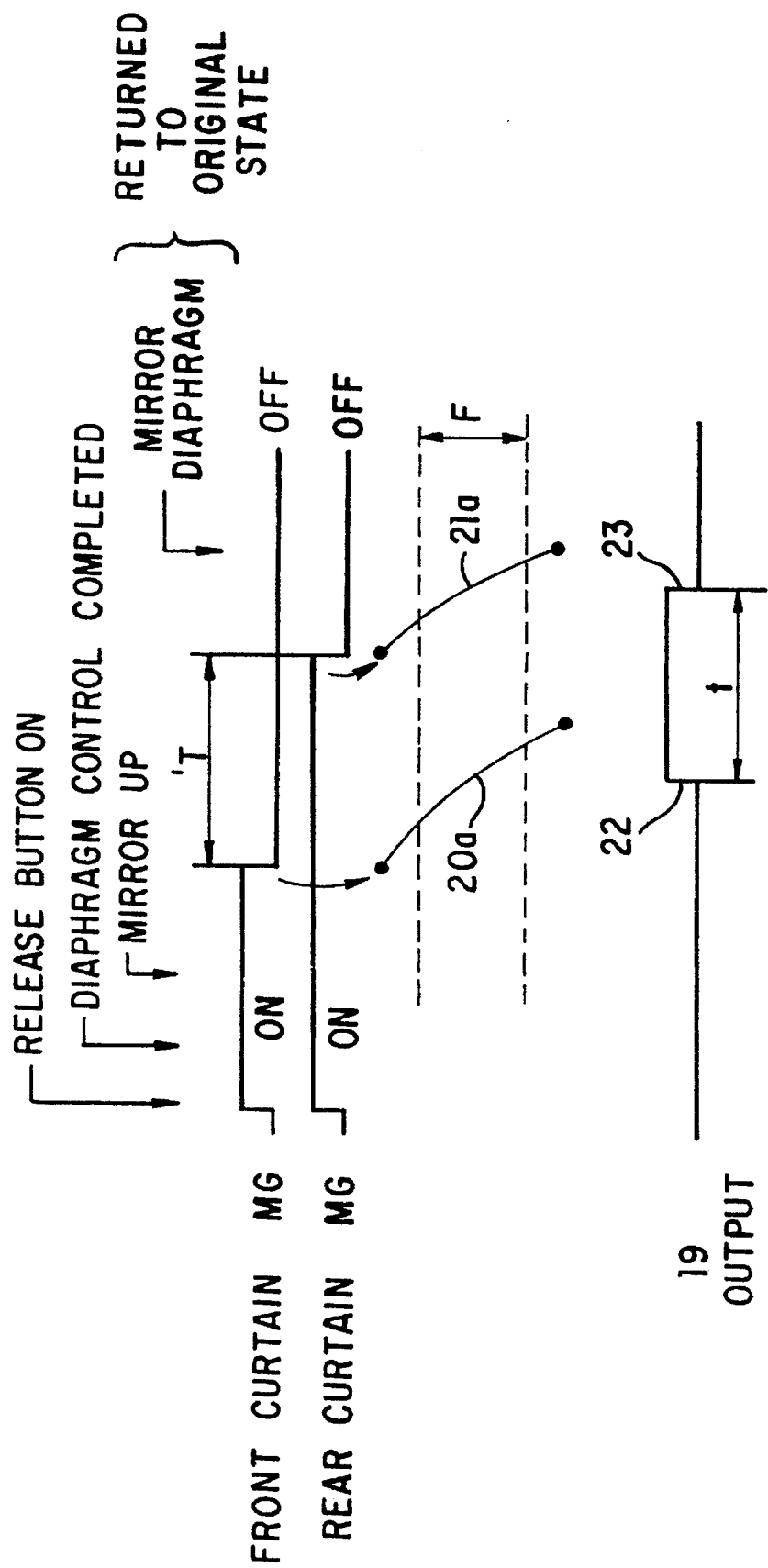
FIG. 18 is a time chart showing a fourth embodiment of a camera according to the present invention.

FIG. 18 is a time chart showing the relationship between the actions of the shutter 108 and the sequence of actions of the camera 101. In FIG. 18, the changing states of movement of the curtains caused by the on/off timing of the magnets (MG) that control the curtains and the change in output signal from the PTR 119 are indicated.

When the release button 110 is depressed, electricity is supplied to the front curtain magnet and the rear curtain magnet, thereby starting the electrical stoppage of the curtains. In this instance, the mechanical stop that was used prior to the depression of the release button 110 is replaced by an electrical control. Subsequently, the diaphragm control of the lens is initially accomplished by the action of a structure not shown in the drawing, and the half-reflective mirror in the photography light path is raised.

Next, the front curtain magnet is turned off, and the front curtain 115 moves along the path indicated by the movement curve 20a (in FIG. 18). The range F here indicated by the dashed lines shows the opening of the aperture, and the movement curve 20a shows the path the curtain traces as it moves through the opening F.

At this time, because the slit-forming flap 121 of the front curtain 115 passes in front of the shutter movement detection means 137 described above, the output of the PTR 119 reverses, as indicated by timing 122, part way along the movement curve 20a. Subsequently, after the preset exposure time interval T has elapsed, the rear curtain magnet is turned off, by which the rear curtain 116 cuts across the opening F along the movement curve 21a. At this time also, because the rear curtain passes in front of the shutter movement detection means 137, the output of the PTR 119 reverses in the manner indicated by timing 123, part way along the movement curve, returning to its original state.

In this way, if the reversal time interval of the PTR 119 is measured in connection with the movement timing of each magnet, it is possible to find the actual exposure time t. For example, even if the exposure control circuit described below correctly measures the preset time T, and the magnets are driven with the correct timing, it is possible to determine the existence of mechanical errors when the control time t obtained from the PTR 119 is different from the preset time T.

Figure 19:
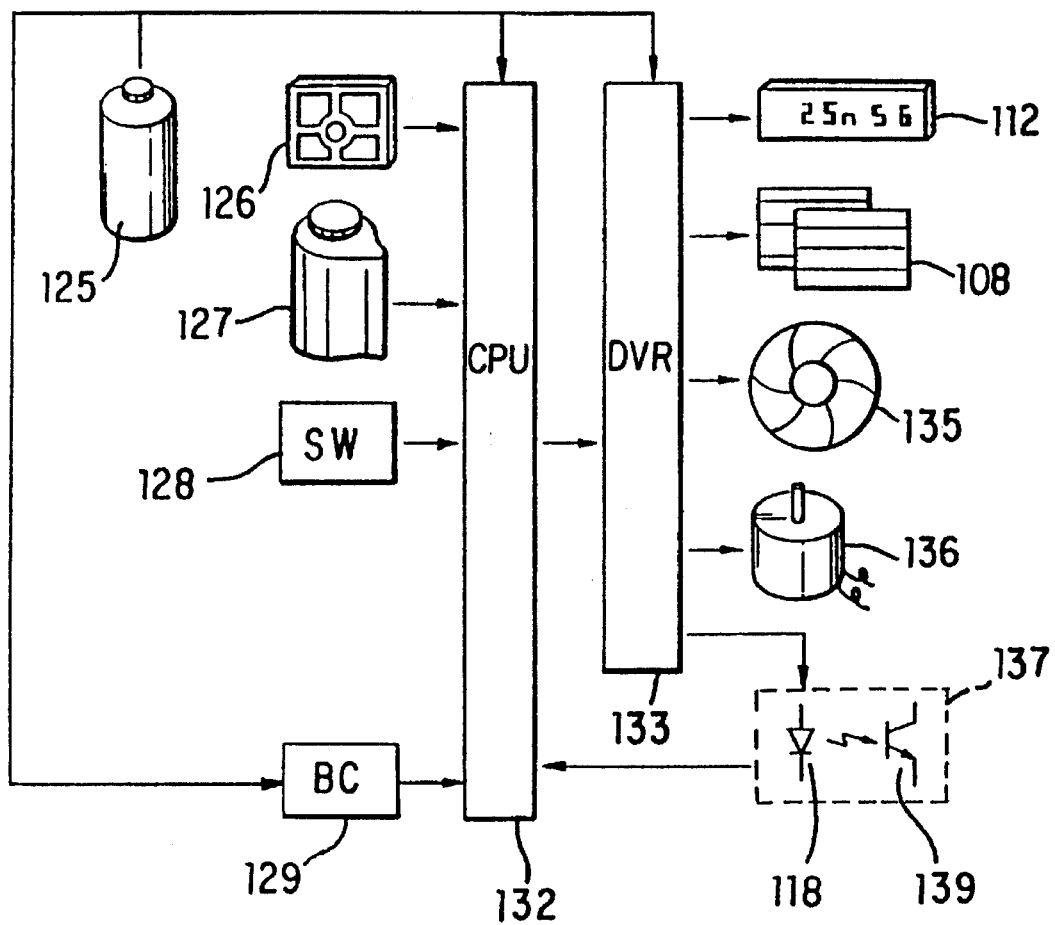
FIG. 19 is a block diagram of the camera according to the fourth embodiment.

FIG. 19 is a block diagram showing the electrical circuit in camera 101 that controls the actions described above. A battery 125 comprises the power source for this circuit, and central control is provided by the CPU 132. The signals input into the CPU are as follows:

First, the photometry means 126, a commonly known sensor means composed of a photo-diode, measures the brightness in each of the several components into which the subject has been divided, and these several photometry values are input into the CPU 132. The film sensitivity detection means 127 reads a coded signal provided on the back surface of the film cartridge displaced within the camera, and the film sensitivity information is input into the CPU 132. The switch detection means 128 covers the manually operated switches, such as those that are connected to the release button 110 described above and the setting buttons 111, and also includes timing switches that detect the sequencing state of the camera. This information about the camera state is input into the CPU 132. The battery voltage detection means 129 determines the voltage across the terminals of the battery 125, and the detected result also is output to the CPU 132.

The output from the CPU 132 drives the camera by means of the driver means 133, in the manner described hereafter.

The LCD 112 is driven in order to display information related to the exposure and operating mode settings, as well as warning information, explained hereafter. The shutter 108, i.e. the action time interval (exposure time T) of the front curtain magnet and the rear curtain magnet described above, is also controlled. The diaphragm 135 within the lens 102 is driven to control the amount of light entering the camera, and the motor 136 is driven to control winding and unwinding of the film and to control the driving force of the springs that drive the shutter. The shutter movement detection means 137 is also controlled. The LED 118 is lighted for the necessary time interval, and the CPU 132 receives the signal generated by the PTR 119, and the determination as to whether or not proper control has been executed is accomplished as follows.

Figure 20:
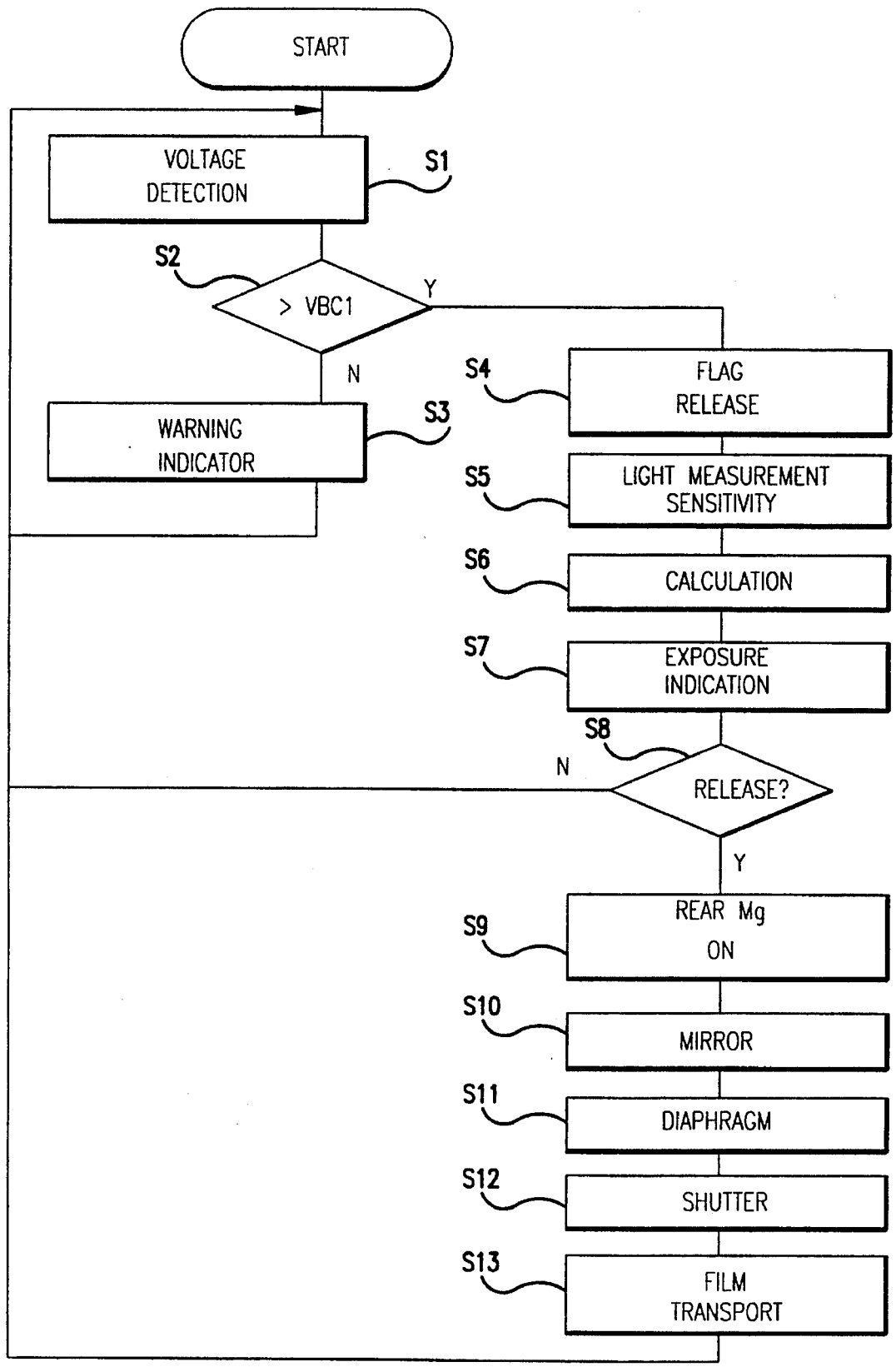
FIG. 20 is a flowchart showing an operation of the CPU illustrated in FIG. 19.

FIG. 20 is a flowchart illustrating the process routine of the CPU 132 in FIG. 19. This routine is repeatedly executed when power is supplied to the camera.

In step S1, the results from the battery voltage detection means 129 are read. In step S2, a determination is made as to the extent of discharge of the battery 25, i.e. a determination is made as to whether or not the voltage is larger or smaller than the preset primary level voltage VBC 1. In this instance, the VBC 1 is a voltage value that indicates the voltage limit that permits operation of the camera 101, and when the battery voltage drops below this value, the camera malfunctions.

Figure 23:
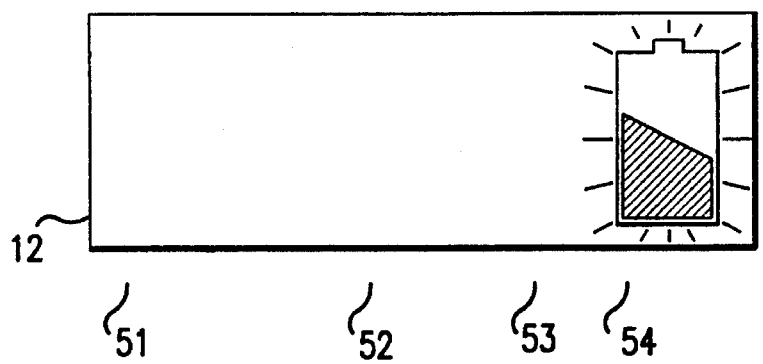
FIGS. 23–26 are views showing examples of the display according to the invention.

If the battery voltage is larger than VBC 1, the CPU moves to step S4, and if it is smaller than VBC 1 it moves to step S3. In step S3, because it has been determined that the battery voltage is less than VBC 1, i.e. that the camera 101 is in a malfunctioning state, the primary warning display is produced by the LCD 112, and the CPU returns to step S1. In this case an example of the primary warning display presented by the LCD 112 is shown in FIG. 23. In FIG. 23, only segment 54 flashes, encouraging the user to replace the battery. In FIG. 23, segment 54 is a mark in the shape of a battery, but the warning need not be limited to this as it would also be acceptable to use an audio warning or the like.

As long as the battery voltage remains below VBC 1, the CPU repeats only the processes from steps S1 through S3, and because it absolutely does not perform the processes from step S4 on, the exposure action and the operation of the shutter movement detection means are not performed.

In step S4, the warning flag set in the CPU 132 is removed. This warning flag is set in step S18 as described hereafter, and its usage will also be explained below.

Figure 24:
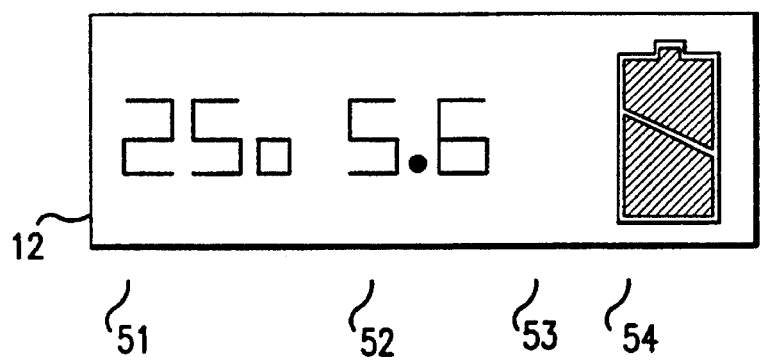

In step S5, the photometry signal from the photometry means 126 and the sensitivity signal from the film sensitivity detection means 127 are read. In step S6, both of these are calculated, and the shutter time and diaphragm value for the appropriate exposure conditions are computed. In step S7, the exposure conditions found in this way are displayed on the LCD 134. An example of this display is shown in FIG. 24. In FIG. 24, all of segment 54 (the battery-shaped mark) is illuminated, indicating that the battery voltage is sufficient.

In step S8, a determination is made by the switch detection means 128 as to whether or not the release button 110 is depressed. If it is not depressed, the CPU returns to step S1 and repeats the processes described above. If it is depressed, the CPU advances to step S9.

In step S9, because the release button 110 is depressed, the front curtain magnet and the rear curtain magnet are first turned on, as explained with reference to FIG. 18. In step S10, a half-reflective mirror, not shown in the diagram, is raised so as to withdraw from the photography optical path. In step S11, the diaphragm 135 is controlled so that it forms a preset diaphragm opening. In step S12, the shutter 108 is opened and closed, and the shutter routine that controls the exposure of the film and the shutter curtain movement state detection routine by the shutter movement detection means 137 are performed. Details of the shutter routine and the shutter curtain movement state detection routine will be provided hereafter with reference to FIGS. 21 and 22. In step S13, the motor 136 is rotated forward to wind the film and drive the mechanism because the exposure action has been completed. The CPU returns to step S1 and repeats the processes.

Figure 21:
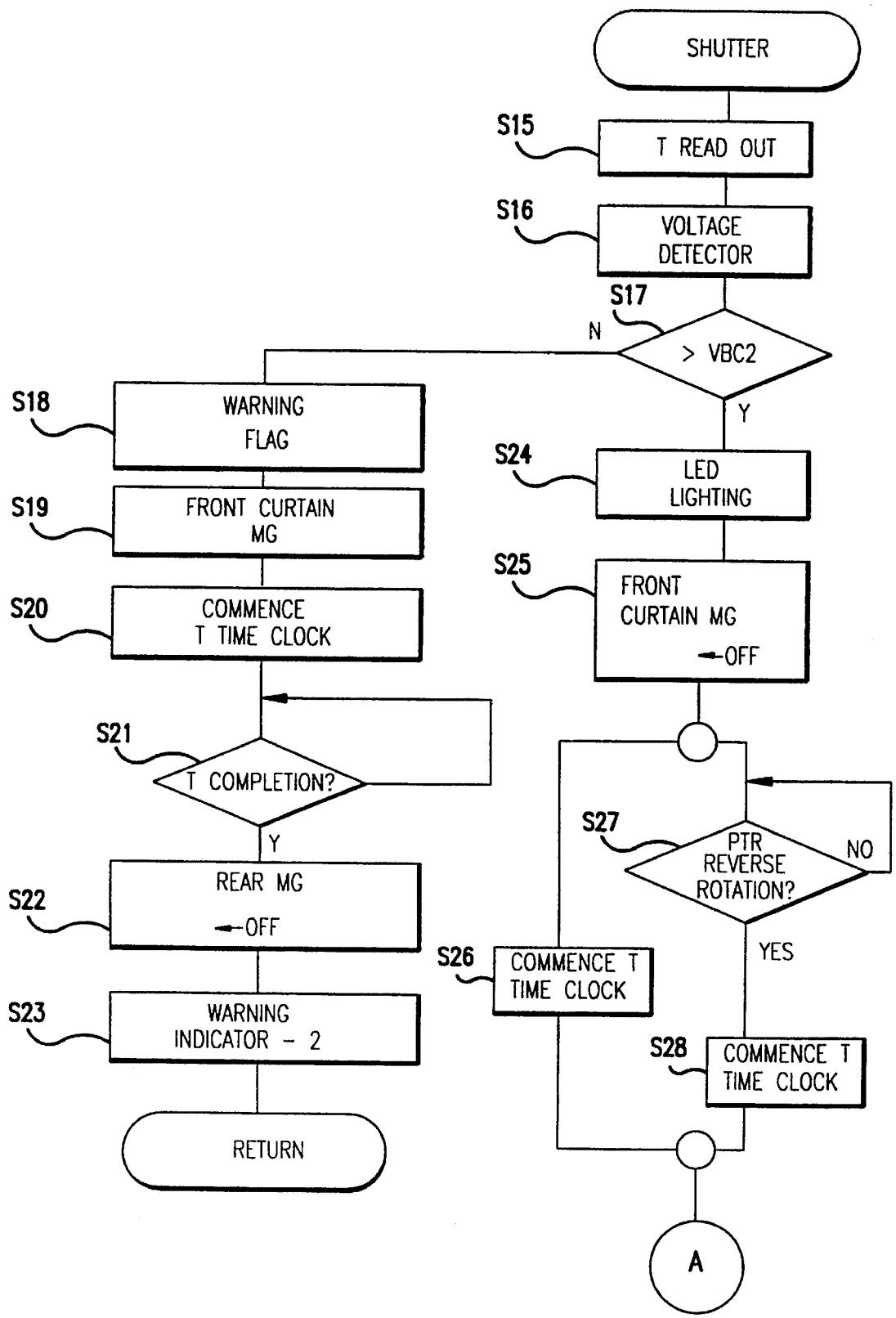
FIGS. 21 and 22 are a flowchart showing the shutter routine and the shutter curtain movement detection routine according to the invention.
Figure 22:
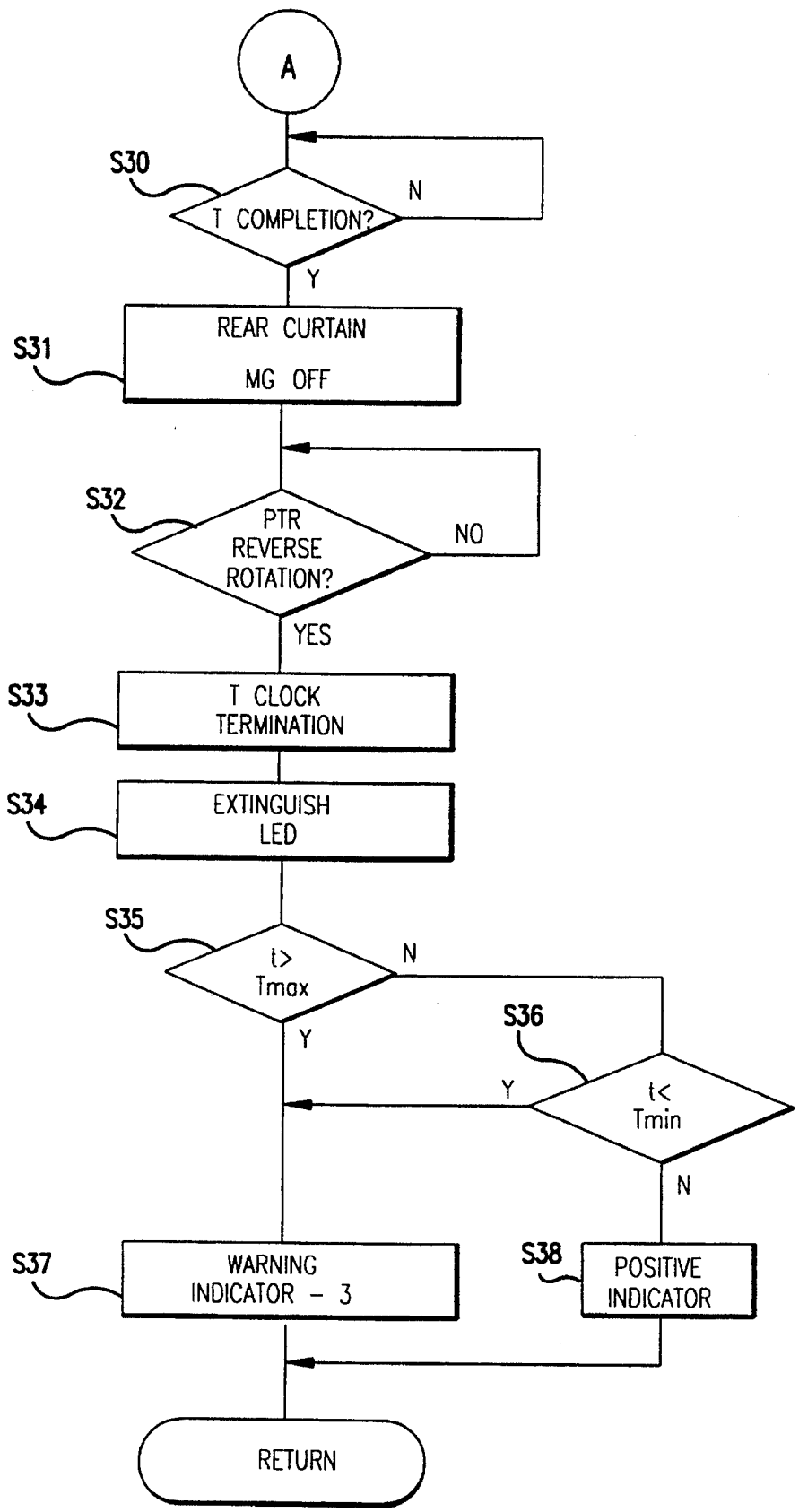

FIGS. 21 and 22 are flowcharts illustrating the details of the shutter routine and shutter curtain movement detection routine of step S12 (in FIG. 20).

In step S15, the shutter time T, which is to be controlled and which was obtained in step S2 (in FIG. 20), is read. In step S16, the results from the battery voltage detection means 129 are read in the same manner as in step S1 (in FIG. 20). In step S17, determination of the discharge of the battery 125 is performed, i.e. determination is made as to whether or not the voltage is larger of smaller than the preset secondary level voltage VBC 2. In this instance, VBC 2 represents a voltage value sufficient for operation of the camera 101 itself, but is a limit value below which power consumption by the shutter movement detection means 127 is suppressed, or at which the shutter movement detection means 137 malfunctions.

If the battery voltage is larger than VBC 2, the CPU moves to step S24, while if it is smaller than VBC 2, it moves to step S18. In step S18, because the battery voltage is below VBC 2, a warning flag is set inside the CPU 132. By setting the flag, a determination can be made as to whether the battery voltage is below VBC 2, but above VBC 1, without further operation of the battery voltage detection means 129. The flag set here is removed when the CPU arrives at step S4 as described above after executing the processes that follow from this point on.

Figure 26:
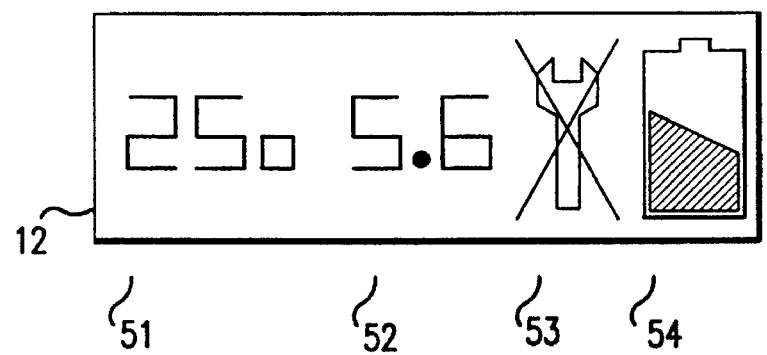

In step S19, the supply of electric power to the front curtain magnet is cut off, thereby causing the front curtain 115 to begin moving. In step S20, measurement of the control time T is initiated. In step S21, the CPU waits for measurement of the control time T to be completed. In step S22, because control time T has been completed, the supply of electric power to the rear curtain magnet is cut off, thereby causing the rear curtain 116 to begin moving. In step S23, a third warning display is shown because it is determined by verifying the warning flag set in step S18 that the processes following step S18 are in a state in which operation of the shutter movement detection means 137 is prevented. FIG. 26 shows an example of this display. In FIG. 26, segment 53 is illuminated, and the fact that the camera is in a state wherein operation of the shutter movement detection means 137 is prevented is indicated. Following this, the CPU returns to step S1 and repeats the processes described above.

In step S24, because the battery voltage is greater than both VBC 1 and VBC 2, the LED 118 inside the shutter movement detection means is first lighted.

In step S25, the supply of electric power to the front curtain magnet is cut off, thereby causing the front curtain 115 to begin moving. In order to make the explanation clear, use will be made of an example wherein the control time T in the embodiment is sufficiently longer than the curtain movement time.

Subsequently, the process in step S26 is performed simultaneously with the processes in steps S27 and S28. In step S26, measurement of the control time T is initiated, and in step S27, the CPU waits for a reversal of the PTR 119 output caused by the passage of the slit-forming flap 121 of the primary curtain 115. In step S28, measurement of the measured time t is initiated.

In step S30 (FIG. 22), the CPU waits for the measurement of the control time T to be completed. In step S31, because control time T has been completed, the supply of electric power to the rear curtain magnet is cut off, thereby causing the rear curtain 116 to begin moving. In step S32, the CPU waits for a reversal of the PTR 119 output caused by the passage of the slit-forming flap 122 of the second curtain 116. In step S33, measurement of the measured time t is completed. In step S34, the LED 118 is shut off because the time measurement has been completed. In step S35, a determination is made as to whether or not the measured time t is longer than the permissible maximum value Tmax of the control time. If the measured time t is longer than the permissible maximum value Tmax of the control time, the CPU moves to step S37. If the measured time t is not longer than the permissible maximum value Tmax of the control time, the CPU moves to step S36.

In step S36, a determination is made as to whether or not the measured time t is shorter than the permissible minimum value Tmin of the control time. If the measured time t is shorter than the permissible minimum value Tmin of the control time, the CPU moves to step S37. If the measured time t is not shorter than the permissible minimum value Tmin of the control time, the CPU moves to step S38.

Figure 25:
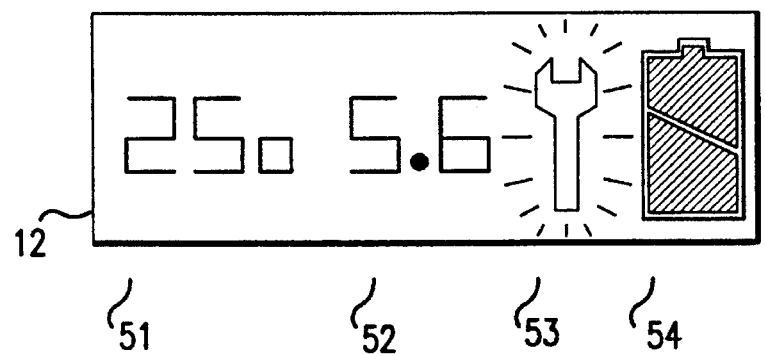

In step S37, the third warning display is shown because the measured time t is outside the permissible range of the control time. An example of the third warning display is shown in FIG. 25. In FIG. 25, the control shutter time and the diaphragm setting are displayed in segments 51 and 52, and segment 54 indicates that there is sufficient voltage from the battery, while segment 53 (a mark shaped like a tool) flashes to indicate that there are abnormalities in the shutter. Following this, the CPU returns to step S1 and repeats the processes described above.

In step S38, a normal display is shown because the measured time t is within the permissible range of the control time. The normal display shows only the control shutter time and diaphragm setting in segments 51 and 52, as in FIG. 24, and the battery voltage state in segment 54.

FIGS. 23 through 26 show examples of the displays on the LCD 12.

First, FIG. 23 is an example of warning display 1 of step S3. Because the battery voltage has dropped to the point that operation of the camera is impossible, segments 51, 52 and 53 are not illuminated, and only a flashing segment 54 is displayed. Here, because segment 54 is a display shaped like a battery, the photographer easily understands that there is some problem with the battery.

FIG. 24 is a display during conditions prior to the operation of the shutter movement detection means 137 in step S7 in which no warning information exists, or a display after it has been determined in step S38 by the shutter movement detection means 137 that the shutter 108 is normal.

FIG. 25 is an example of warning display 103 of step S37 and is a display that warns that the shutter movement detection means 137 has detected that the shutter 108 has not operated normally. The need for repair of the camera is indicated by segment 53 flashing.

FIG. 26 is an example of warning display 102 of step S23, and indicates that only the exposure action and not the operation of the shutter movement detection means 137 has been performed. By displaying an "X" over segment 53, the display indicates the operation of the shutter movement detection means 137 has not been performed.

As explained above, when the battery voltage is low, the shutter control operation itself is prevented as is operation of the shutter detection action. In addition, when the battery voltage is sufficiently high, both the shutter control operation and the detection operation are permitted, and a warning action is performed if the detected results are abnormal. On the other hand, when the battery voltage is between these two extremes, only the shutter control operation is permitted while the shutter detection operation is prevented, and a display indicates that the shutter detection operation is not being performed.

In this embodiment, a concrete explanation of the battery voltage detection means 129 has not been provided, but methods of accomplishing this are well known and any method can be applied to the present invention. In addition, an example has been shown in which an LED 118 and a PTR 119 are used in the shutter movement detection means 137, but it is also possible to apply to the present invention any circuit means as long as it consumes electric power.

As described above, with a camera according to the present invention, the voltage generated by the power source is measured by a voltage measurement means and operation or non-operation of the shutter measurement means is controlled in accordance with the discharge of the power source (battery). Therefore, malfunctions of the camera caused by the discharge of the battery can be eliminated, thereby enabling reliable photography.

While the invention has been described in detail with reference to preferred embodiments thereof, which are intended to be illustrative but not limiting, various changes may be made without departing from the spirit and scope of the invention, which is defined in the following claims.

What is claimed is:

1. A camera including a photographic recording medium exposeable to light to record a photographic image, the camera comprising:

a shutter that regulates an exposure time of the recording medium;

a shutter measuring device coupled to said shutter, said shutter measuring device measuring a time during which the shutter exposes the recording medium;

a determining means that determines a type of recording medium, the type being one of infrared sensitive and non-infrared sensitive; and a controller coupled to said shutter measuring device, said controller controlling operation of said shutter measuring device in accordance with at least one of the type of said recording medium and a voltage amount supplied to said shutter measuring device.

2. A camera according to claim 1, wherein said controller comprises a preventing device that prevents operation of said shutter measuring device if the recording medium is an infrared sensitive medium.

3. A camera according to claim 1, wherein said determining device comprises at least one contact pin, operatively engageable with a corresponding cartridge signal component of the recording medium.

4. A camera according to claim 1, further comprising:

a position detector that discerns whether the recording medium is in a position that allows exposure; and a regulator coupled to said position detector, said regulator causing a preventing device within said controller to prevent operation of said shutter measuring device when the position detector detects a position allowing exposure, and causing the preventing device to allow operation of said shutter measuring device when a position is detected that does not allow exposure.

5. A camera according to claim 1, further comprising:

a power source coupled to said shutter and said shutter measurement device, said power source supplying electric power to said shutter and said shutter measurement device; and a voltage measurement device coupled to said power source, said voltage measurement device measuring voltage generated by said power source.

6. A camera according to claim 5, further comprising a comparator that compares the voltage measured by the voltage measurement device with a reference voltage, wherein said controller controls the shutter measurement device in accordance with the comparison made by said comparator.

7. A camera according to claim 6, wherein the controller prevents operation of the shutter measurement device if, as a result of the comparison made by said comparator, the measured voltage is lower than the reference voltage.

8. A camera according to claim 7, further comprising a notification device that notifies the photographer in the event that the controller prevents operation.

9. A camera according to claim 6, wherein the comparator compares the voltage measured by the voltage measurement device, a primary reference voltage, and a secondary reference voltage, which is higher than the primary reference voltage, the control device preventing operation of both the shutter and the shutter measurement device if the measured voltage is lower than the primary reference voltage, said controller preventing operation of only the shutter measurement device if the measured voltage is lower than the secondary reference voltage.

10. A camera including a photographic recording medium exposable to light to record a photographic image, the camera comprising:

a shutter that regulates an exposure time of the recording medium;

a shutter measuring device coupled to said shutter, said shutter measuring device measuring a time during which the shutter exposes the recording medium;

a type detector that detects a type of the recording medium, the type detector detecting whether sensitization information from the recording medium can be detected; and a preventing device that prevents operation of said shutter measuring device in accordance with the detection by said type detector.

11. A camera according to claim 10, wherein if the sensitization information cannot be detected, the preventing device prevents operation of said shutter measuring device.

12. A camera according to claim 10, further comprising:

a position detector that discerns whether the recording medium is in a position that allows exposure; and a regulator coupled to said position detector, said regulator causing the preventing device to allow operation of said shutter measuring device when the position detector detects a position allowing exposure, and causing the preventing device to prevent operation when a position is detected that does not allow exposure.

13. A camera according to claim 10, wherein if the recording medium is detected to be an infrared light sensitive medium, the preventing device preventing operation of said shutter measurement device.

14. A camera including a photographic recording medium exposable to light to record a photographic image, the camera comprising:

a shutter that regulates an exposure time of the recording medium;

a shutter measuring device including a light radiator that radiates light, as well as a light receiver that receives the light from the light radiator, said shutter measuring device measuring a time during which the shutter exposes the recording medium;

a type detector that detects a type of the recording medium; and a regulator that regulates at least one of an amount of radiation from the light radiator and a light receiving sensitivity of the light receiver, based on the result detected by the type detector.

15. A camera according to claim 14, wherein the type detector detects whether the recording medium is an infrared sensitive medium, and if so, the regulator decreasing the amount of light radiated.

16. A camera according to claim 15, wherein the type detector detects whether the recording medium is an infrared sensitive medium, and if so, the regulator increasing the light receiving sensitization.

17. A camera according to claim 14, wherein said regulator is a wavelength limit regulator that regulates radiation wavelength limits of the light radiator, based on the type of the recording medium.

18. A camera according to claim 17, wherein the light radiator comprises a plurality of radiating components that radiate light of differing wavelength limits, and wherein the wavelength limit regulator selects a single radiating component from among the plurality of radiating components and causes it to radiate, based on the type of the recording medium.

19. A camera according to claim 17, further comprising a plurality of filters that have different limits of wavelength penetration, and wherein the wavelength limit regulator selects a single filter from among the plurality of filters and sets it up between the light radiator and the light receiver based on the type of the recording medium.

20. A camera according to claim 17, wherein the type detector detects the wavelength limits of sensitization of the recording medium, and wherein the wavelength regulator regulates the radiation wavelength limits so as to be different from the wavelength limits of sensitization.

21. A camera including a photographic recording medium exposable to light to record a photographic image, the camera comprising:

a shutter that controls an exposure time of the recording medium;

a shutter measurement device coupled to said shutter, said shutter measuring device measuring a time during which said shutter exposes said recording medium to light;

a power source coupled to said shutter and said shutter measurement device, said power source supplying electric power to said shutter and said shutter measurement device;

a voltage measurement device coupled to said power source, said voltage measurement device measuring voltage generated by said power source or a supply capacity of said power source;

a comparator that compares the voltage measured by the voltage measurement device with a reference voltage; and a controller that controls at least one of the shutter and the shutter measurement device based on the comparison made by said comparator.

22. A camera according to claim 21, wherein the controller prevents operation of at least one of the shutter and the shutter measurement device if, as a result of the comparison made by said comparator, the measured voltage is lower than the reference voltage.

23. A camera according to claim 22, further comprising a notification device that notifies the photographer in the event that the controller prevents operation.

24. A camera according to claim 21, wherein the comparator compares the voltage measured by the voltage measurement device, a primary reference voltage, and a secondary reference voltage, which is higher than the primary reference voltage, the control device preventing operation of both the shutter and the shutter measurement device if the measured voltage is lower than the primary reference voltage, said controller preventing operation of only the shutter measurement device if the measured voltage is lower than the secondary reference voltage.

25. A method of operating a camera including a photographic recording medium exposable to light to record a photographic image, the recording medium being exposed by a shutter that regulates an exposure time of the recording medium, the method comprising:

measuring with a shutter measuring device a time during which the shutter exposes the recording medium;

detecting a type of recording medium, the type being one of infrared sensitive and non-infrared sensitive; and controlling operation of said shutter measuring device in accordance with at least one of the type of said recording medium and a voltage amount supplied to said shutter measuring device.

26. A method according to claim 25, further comprising suppressing operation of said shutter measuring device if the recording medium is an infrared sensitive medium.

27. A method according to claim 25, further comprising:

determining whether the recording medium is in a position that allows exposure;

preventing operation of said shutter measuring device only when the position detector detects a position allowing exposure and the recording medium is an infrared medium; and permitting operation when a position is detected that does not allow exposure.

28. A method according to claim 25, the camera further comprising a power source coupled to said shutter and said shutter measurement device, said power source supplying electric power to said shutter and said shutter measurement device, the method further comprising measuring voltage generated by said power source.

29. A method according to claim 28, further comprising comparing the voltage measured by the voltage measurement device with a reference voltage, and controlling the shutter measurement device in accordance with the comparing step.

30. A method according to claim 29, further comprising preventing operation of the shutter measurement device if, as a result of the comparing step, the measured voltage is lower than the reference voltage.

31. A method according to claim 30, further comprising notifying the photographer in the event that operation is prevented.

32. A method according to claim 29, wherein the comparing step comprises comparing the voltage measured by the voltage measurement device, a primary reference voltage, and a secondary reference voltage, which is higher than the primary reference voltage, the method comprising the step of preventing operation of both the shutter and the shutter measurement device if the measured voltage is lower than the primary reference voltage, wherein operation of only the shutter measurement device is prevented if the measured voltage is lower than the secondary reference voltage.

33. A method of operating a camera including a photographic recording medium exposable to light to record a photographic image, the recording medium being exposed by a shutter that regulates an exposure time of the recording medium, the method comprising:

measuring with a shutter measuring device a time during which the shutter exposes the recording medium;

detecting a type of the recording medium, the detecting comprising determining whether sensitization information from the recording medium can be detected; and preventing operation of said shutter measuring device in accordance with the detecting step.

34. A method according to claim 33, wherein if the detecting step determines that sensitization information cannot be detected, operation of said shutter measuring device is prevented.

35. A method according to claim 33, further comprising:

detecting whether the recording medium is in a position that allows exposure;

allowing operation of said shutter measuring device when a position is detected that does not allow exposure; and preventing operation of said shutter measuring device when the detecting step detects a position allowing exposure and the recording medium is an infrared sensitive medium.

36. A method according to claim 33, wherein if the recording medium is detected to be an infrared light sensitive medium, then method including preventing operation of said shutter measurement device.

37. A method of operating a camera including a photographic recording medium exposable to light to record a photographic image, the recording medium being exposed by a shutter that regulates an exposure time of the recording medium, the method comprising:

measuring, with a shutter measuring device including a light radiator that radiates light as well as a light receiver that receives the light from the light radiator, a time during which the shutter exposes the recording medium;

detecting a type of the recording medium; and regulating at least one of an amount of radiation from the light radiator and a light receiving sensitivity of the light receiver, based on the result of the detecting step.

38. A method according to claim 37, wherein the detecting step comprises detecting whether the recording medium is an infrared sensitive medium, and if so, decreasing the amount of light radiated.

39. A method according to claim 38, wherein the detecting step comprises detecting whether the recording medium is an infrared sensitive medium, and if so, the increasing the light receiving sensitization.

40. A method according to claim 37, wherein said regulator is a wavelength limit regulator regulating radiation wavelength limits of the light radiator, based on the type of the recording medium.

41. A method according to claim 40, wherein the light radiator comprises a plurality of radiating components that radiate light of differing wavelength limits, the regulating step comprising selecting a single radiating component from among the plurality of radiating components and causing it to radiate, based on the type of the recording medium.

42. A method according to claim 40, further comprising a plurality of filters that have different limits of wavelength penetration, the regulating step comprising selecting a single filter from among the plurality of filters and sets it up between the light radiator and the light receiver based on the type of the recording medium.

43. A method according to claim 40, wherein the detecting step comprises detecting the wavelength limits of sensitization of the recording medium, and the regulating step comprises regulating the radiation wavelength limits so as to be different from the wavelength limits of sensitization.

44. A method of operating a camera including a photographic recording medium exposable to light to record a photographic image, the recording medium being exposed by a shutter that regulates an exposure time of the recording medium, the camera comprising a power source supplying electric power to said shutter and a shutter measurement device, the method comprising:

measuring with said shutter measurement device a time during which said shutter exposes said recording medium to light;

measuring voltage generated by said power source or a supply capacity of said power source;

comparing the voltage measured by the voltage measurement device with a reference voltage; and controlling at least one of the shutter and the shutter measurement device based on the comparison made in the comparing step.

45. A method according to claim 44, wherein the controlling step comprises preventing operation of at least one of the shutter and the shutter measurement device if, as a result of the comparing step, the measured voltage is lower than the reference voltage.

46. A method according to claim 45, further comprising notifying the photographer in the event that operation is prevented.

47. A method according to claim 44, wherein the comparing step comprises comparing the voltage measured in the voltage measuring step, a primary reference voltage, and a secondary reference voltage, which is higher than the primary reference voltage, the controlling step comprising preventing operation of both the shutter and the shutter measurement device if the measured voltage is lower than the primary reference voltage, said controlling step comprising preventing operation of only the shutter measurement device if the measured voltage is lower than the secondary reference voltage.

* * * * *